(12) United States Patent
Konoshima

(10) Patent No.: US 8,411,739 B2
(45) Date of Patent: Apr. 2, 2013

(54) BITSTREAM CONVERSION METHOD, BITSTREAM CONVERSION APPARATUS, BITSTREAM CONNECTING APPARATUS, BITSTREAM SPLITTING PROGRAM, BITSTREAM CONVERSION PROGRAM, AND BITSTREAM CONNECTING PROGRAM

(75) Inventor: Makiko Konoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 12/461,589

(22) Filed: Aug. 17, 2009

(65) Prior Publication Data

US 2009/0310669 A1    Dec. 17, 2009

Related U.S. Application Data

(63) Continuation of application No. PCT/JP2007/055556, filed on Mar. 19, 2007.

(51) Int. Cl.
*H04N 11/02* (2006.01)
(52) U.S. Cl. .................................. 375/240.01
(58) Field of Classification Search .............. 375/240.01
See application file for complete search history.

(56) References Cited

U.S. PATENT DOCUMENTS

| | | | |
|---|---|---|---|
| 5,351,083 A | 9/1994 | Tsukagoshi |
| 5,883,671 A | 3/1999 | Keng et al. |
| 5,937,138 A | 8/1999 | Fukuda et al. |
| 2002/0057739 A1 | 5/2002 | Hasebe et al. |
| 2003/0085902 A1 | 5/2003 | Vogelaar et al. |
| 2004/0151244 A1 | 8/2004 | Kim et al. |
| 2005/0243922 A1 | 11/2005 | Magee et al. |

FOREIGN PATENT DOCUMENTS

| | | |
|---|---|---|
| JP | 5-183891 | 7/1993 |
| JP | 9-284756 | 10/1997 |
| JP | 2001-86460 | 3/2001 |
| JP | 2002-199392 | 7/2002 |
| JP | 2004-159079 | 6/2004 |
| JP | 2004-236337 | 8/2004 |
| JP | 2004-357002 | 12/2004 |
| JP | 2005-33382 | 2/2005 |
| JP | 2005-176069 | 6/2005 |
| JP | 2006-352443 | 12/2006 |
| WO | 97/13367 | 4/1997 |

OTHER PUBLICATIONS

Ogami, Takamitsu "A Study on a Compliant VBV Buffer Model for Distributed Video Transcoding", Information Processing Society of Japan Technical Report (2004-AMV-44), Information Processing Society of Japan, Mar. 4, 2004, vol. 2004, No. 25. pp. 31-36.*
Japanese Office Action issued Oct. 18, 2011 in corresponding Japanese Patent Application No. 2009-504993.
Takamitsu Oogami et al. "A study on a compliant VBV Buffer Model for Distributed Video Transcoding," Information Processing Society of Japan Technical Report, 2004, pp. 31-36.

(Continued)

*Primary Examiner* — Sath V Perungavoor
*Assistant Examiner* — Jeffery Williams
(74) *Attorney, Agent, or Firm* — Staas & Halsey LLP

(57) ABSTRACT

A bitstream conversion apparatus for converting a bitstream of a first format, containing content data, into a bitstream of a second format includes: a splitting unit which splits the bitstream of the first format in time sequential fashion into a plurality of split bitstreams of the first format; a plurality of conversion units which convert the plurality of split bitstreams of the first format into a plurality of split bitstreams of the second format; and a connecting unit which connects the plurality of split bitstreams of the second format to one another.

15 Claims, 20 Drawing Sheets

OTHER PUBLICATIONS

Sambe Y et al., "High-Speed Distributed Video Transcoding for Multiple Rates and Formats", IEICE Transactions on Information and Systems, vol. E88-D, No. 8, Aug. 2005, pp. 1923-1931.

Sambe Y. et al, "Distributed Video Transcoding and its Application to Grid Delivery", The 9$^{th}$ Asia-Pacific Conference on Communications (APCC 2003), Sep. 2003, IEEE, vol. 1, pp. 98-102.

European Search Report dated May 11, 2011 in corresponding European Patent Application 07738999.7.

Takamitsu Ogami et al., "A Study on a compliant VBV Buffer Model for Distributed Video Transcoding", IPSJ SIG Technical Report, 2004-AVM-44, Mar. 4, 2004, pp. 31-36.

International Search Report for PCT/JP2007/055556, mailed Jun. 26, 2007.

* cited by examiner

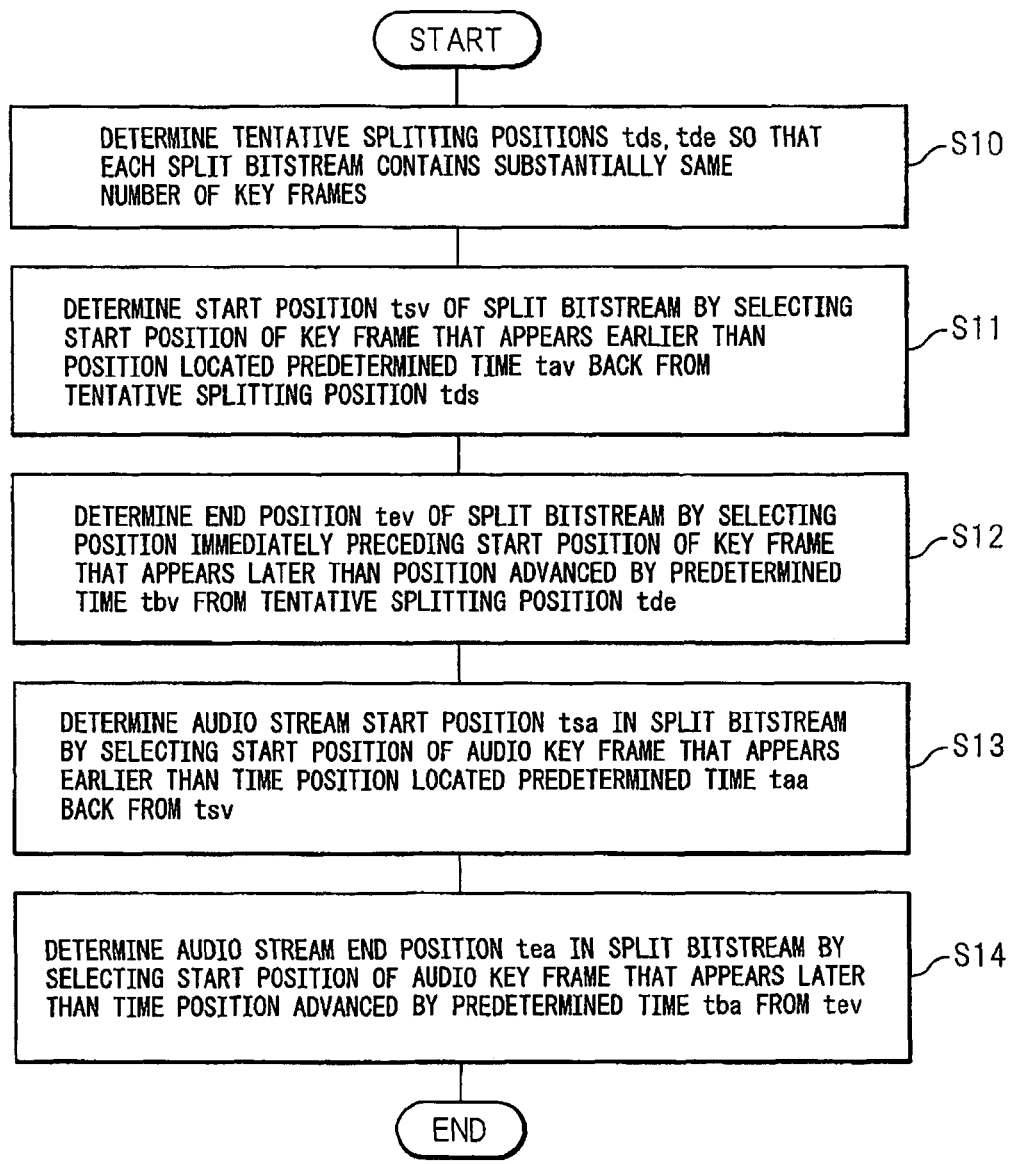

BITSTREAM CONVERSION METHOD, BITSTREAM CONVERSION APPARATUS, BITSTREAM CONNECTING APPARATUS, BITSTREAM SPLITTING PROGRAM, BITSTREAM CONVERSION PROGRAM, AND BITSTREAM CONNECTING PROGRAM

CROSS REFERENCE TO RELATED APPLICATION

The present application is a continuation application based on International application No. PCT/JP2007/055556, filed on Mar. 19, 2007.

TECHNICAL FIELD

The present invention relates to media signal encoding techniques for compressing moving image signals and audio signals by utilizing spatial and temporal correlation inherently present in the moving image signals and temporal correlation inherently present in the audio signals. More particularly, the invention relates to stream conversion techniques for converting a bitstream containing a moving image stream and an audio stream from one format to another.

BACKGROUND ART

For providers who deliver bitstreams containing content data, such as moving image streams and audio streams, if the efficiency of network resources can be enhanced, it will be advantageous in reducing operational costs. There is therefore a need to reduce the file size of data to be delivered, by converting already compressed bitstreams into bitstreams encoded by a higher-efficiency encoding scheme.

From a user's side there is also a need for converting a large-capacity video stream into a video stream of a smaller file size so that the video stream can be easily previewed on an existing network having a limited transmission band.

FIGS. 1A and 1B are diagrams each depicting a prior art process for converting a bitstream encoded in a given format (scheme A) into a bitstream of a different format (scheme B). The process depicted in FIG. 1A performs the conversion by using a decoder of scheme A, which converts the bitstream of scheme A back into the original data, in combination of an encoder of scheme B which converts the original data into the bitstream of scheme B, while the process depicted in FIG. 1B converts the bitstream of scheme A directly into the bitstream of scheme B. In either case, the conversion process is not performed in a parallel fashion, but performed continuously starting from the beginning of the bitstream and working through to the end thereof.

The bitstream format is defined by using various elements. For example, when the bitstream contains a moving image stream, the bitstream format is defined, for example, by the encoding scheme used to encode the moving image stream, the bit rate and frame rate of the stream or the size of the moving image, etc. On the other hand, when the bitstream contains an audio stream, for example, the bitstream format is defined by the encoding scheme used to encode the audio stream, the bit rate and frame rate of the stream, etc.

Patent document 1 listed below discloses a video encoding method and apparatus that can encode video scene data efficiently in a parallel fashion.

Patent document 2 listed below discloses an image encoding and decoding method which, when an image is encoded after it is split into a plurality of screen images, can prevent boundaries from becoming noticeable in the reconstructed image.

Patent document 3 listed below discloses a moving image encoding apparatus that can encode a moving image signal with high efficiency while preventing image degradation even when the moving image signal is encoded after it is divided it into a plurality of screen images.

Patent document 4 listed below discloses a method for using the slice structure used in video encoding in order to encode and decode a part of video redundantly.

Patent document 5 listed below discloses a multimedia conversion system that converts only the difference between the section the user specified from among multimedia data and the already converted section of the multimedia data and combines it with the already converted multimedia data for delivery to the user.

Patent document 6 listed below discloses an encoding method that makes it possible to reproduce an image smoothly even when a plurality of separately encoded bitstreams are decoded successively.

Patent document 7 listed below discloses a video/audio signal editing apparatus which, when trimming an MPEG-2PS stream, generates data containing sequence-end information that follows the data immediately preceding the deletion start position, generates data containing sequence-start information at the position immediately preceding the data that follows the deletion end position, and updates the file management information so that the generated data are contiguous with each other.

Patent document 8 listed below discloses a distributed parallel transcoder system, which limits the connecting point of a plurality of split image data to a scene change point.

Patent document 1: Japanese Unexamined Patent Publication No. 2002-199392

Patent document 2: Japanese Unexamined Patent Publication No. H09-284756

Patent document 3: Japanese Unexamined Patent Publication No. H05-183891

Patent document 4: Japanese Unexamined Patent Publication No. 2004-236337

Patent document 5: Japanese Unexamined Patent Publication No. 2006-352443

Patent document 6: International Publication Pamphlet No. 97/13367

Patent document 7: Japanese Unexamined Patent Publication No. 2005-33382

Patent document 8: Japanese Unexamined Patent Publication No. 2005-176069

DISCLOSURE OF THE INVENTION

As previously described, the need for converting a bitstream of a given format into a bitstream of a different format has been greatly increasing, and the number of pieces of content that need such conversion has also been rapidly increasing. However, the conversion of a bitstream (especially, in the case of a moving image stream) involves a large amount of processing and, given the present state of the art of computers commonly in use today, the ratio of conversion time to stream playback time cannot be readily increased. As a result, according to the prior art method that does not perform parallel processing, if a bitstream having a long playback time is to be converted, the required time inevitably increases.

In view of the above situation, it is an object of the present invention to reduce the bitstream conversion time by splitting the bitstream and converting the split bitstreams in a parallel fashion.

In the present invention, when converting a bitstream of a first format, containing content data, into a bitstream of a second format, the bitstream of the first format is first split in time sequential fashion into a plurality of split bitstreams of the first format, and then these split bitstreams are converted in a parallel fashion into a plurality of split bitstreams of the second format; after that, the split bitstreams of the second format are connected together to produce the bitstream of the second format.

According to the present invention, since the conversion process that involves the largest amount of processing can be performed in a parallel fashion, it is possible to reduce the conversion time by increasing the number of bitstream conversion means.

However, when the plurality of bitstreams produced after a single bitstream is split in time sequential fashion are converted in a parallel fashion, since each stream is converted without using information from its immediately preceding stream, a substantial difference in image quality can occur at each stream connecting position, rendering the resulting image visually unbalanced.

Further, in many bitstream encoding techniques, a speed smoothing memory called a buffer is used to smooth out variations in encoded signal transmission speed caused by variations in the amount of produced information, and an upper limit to the buffer occupancy, which represents the amount of information that can be stored in the buffer, is predefined in a specification. During encoding, overflow control is performed by controlling the bit rate for encoding so that the upper limit will not be exceeded. However, if a single bitstream is split into a plurality of bitstreams, and the streams are converted in a parallel fashion, then when performing overflow control during the encoding of any given stream it is not possible to refer to the amount of information that occurred during the encoding of the previous stream. As a result, when the bitstreams are connected together, a situation can occur where the buffer occupancy exceeds the predefined upper limit.

In view of this, in the present invention, provisions are made to split the bitstream of the first format by providing an overlapping portion at each splitting position so that a selection can be made from a plurality of splitting positions.

Further, in the present invention, prescribed auxiliary information that is referred to in order to select a connecting position at which to connect together the split bitstreams of the second format is generated for each key frame contained in the overlapping portion of the split bitstreams of the second format. Then, the split bitstreams of the second format are connected together at the key frame position where the difference between the auxiliary information generated for each of successive bitstreams are connected together is the smallest.

For example, when the bitstream of the first format contains an image stream, information concerning the amount of information produced during the processing of each frame contained in the image stream, information concerning the image quality of each frame, information that provides a measure of similarity between frames, etc., may be used as the auxiliary information.

When information concerning the amount of information and image quality is used as the auxiliary information, and when any two successive streams are connected together at the position where the auxiliary information difference between the corresponding key frames contained in the overlapping portion of the streams is the smallest, the difference in image quality at the connecting position becomes substantially unnoticeable.

Further, buffer occupancy information such as VBV (Video Buffering Verifier) buffer occupancy, i.e., the amount of information obtained by subtracting, from the total amount of information produced during the encoding of the first frame to the current frame, the amount of information that can be transmitted for playback during that period, may be used as the amount of produced information.

When such buffer occupancy information is used as the auxiliary information, and when the streams are connected together at the position where the difference in buffer occupancy is the smallest, it is possible to suppress the variation in buffer occupancy that occurs at the connecting position, and thus the buffer occupancy can be prevented from violating the predefined upper limit.

Furthermore, when information that provides a measure of similarity between corresponding frames, such as motion vector information generated for the respective frames, is used as the auxiliary information, and when the streams are connected together at the position where the difference of such information is the smallest, the difference in image quality at the connecting position can also be made substantially unnoticeable.

According to a first mode of the present invention, there is provided a bitstream conversion method for converting a bitstream of a first format, containing content data, into a bitstream of a second format. The method includes: splitting the bitstream of the first format in time sequential fashion into a plurality of split bitstreams of the first format; converting the plurality of split bitstreams of the first format in a parallel fashion into a plurality of split bitstreams of the second format; and connecting the plurality of split bitstreams of the second format to one another.

According to a second mode of the present invention, there is provided a bitstream conversion apparatus for converting a bitstream of a first format, containing content data, into a bitstream of a second format. The bitstream conversion apparatus includes: a splitting unit which splits the bitstream of the first format in time sequential fashion into a plurality of split bitstreams of the first format; a plurality of conversion units which convert the plurality of split bitstreams of the first format into a plurality of split bitstreams of the second format; and a connecting unit which connects the plurality of split bitstreams of the second format to one another.

According to a third mode of the present invention, there is provided a bitstream connecting apparatus for connecting a plurality of split bitstreams of a second format to one another, the plurality of split bitstreams of the second format being obtained by first splitting a bitstream of a first format, containing content data, in time sequential fashion into a plurality of split bitstreams of the first format so as to provide an overlapping portion therebetween and then converting the split bitstreams of the first format into the split bitstream of the second format. The bitstream connecting apparatus includes a connecting frame position determining unit and a data connecting unit which connects one stream to an ensuing stream at a connecting frame position; the connecting frame position determining unit receives prescribed auxiliary information that is generated for each key frame contained in the overlapping portion of the split bitstreams of the second format and that is referred to in order to select the connecting position at which to connect together the split bitstreams of the second format. Then, the connecting frame position determining unit determines the connecting frame position for connecting one stream to the ensuing stream by selecting a key frame position where the difference between the auxiliary information generated for the one stream and the auxiliary information generated for the ensuing stream is the smallest.

According to a fourth mode of the present invention, there is provided a bitstream splitting program for use in a bitstream conversion apparatus that converts a bitstream of a first format, containing content data, into a bitstream of a second format, and that includes a splitting unit which splits the bitstream of the first format in time sequential fashion into a plurality of split bitstreams of the first format, a plurality of conversion units which convert the plurality of split bitstreams of the first format into a plurality of split bitstreams of the second format, and a connecting unit which connects the plurality of split bitstreams of the second format to one another, the bitstream splitting program being run on a computer for bitstream splitting process provided as the splitting unit. This bitstream splitting program causes the computer for betstream splitting process to execute a splitting process for splitting the bitstream of the first format in time sequential fashion into the plurality of split bitstreams.

According to a fifth mode of the present invention, there is provided a bitstream conversion program which is run on a computer for bitstream conversion process provided as the conversion unit that converts, into the split bitstreams of the second format, the split bitstreams of the first format into which the bitstream of the first format, containing at least a moving image stream, has been split by the bitstream splitting program of the fourth mode described above. This bitstream conversion program causes the computer for bitstream conversion process to execute an auxiliary information generating process for generating, for each key frame contained in the overlapping portion of the split bitstreams of the second format, prescribed auxiliary information that is referred to in order to select a connecting position at which to connect together the split bitstreams of the second format.

According to a sixth mode of the present invention, there is provided a bitstream connecting program which is run on a computer for bitstream connecting process provided as the connecting unit that receives from the plurality of conversion units the auxiliary information and the split bitstreams converted to the second format by the bitstream conversion program of the fifth mode described above, and that connects the plurality of split bitstreams of the second format to one another. This bitstream connecting program causes the computer for bitstream connecting process to execute: a connecting position determining process for determining a connecting position for connecting one stream to an ensuing stream by selecting a key frame position where the difference between the auxiliary information generated for the one stream and the auxiliary information generated for the ensuing stream is the smallest; and a data connecting process for connecting the one stream to the ensuing stream at the thus determined connecting position.

BRIEF DESCRIPTION OF THE DRAWINGS

FIG. 7 is a flowchart illustrating a first example of a bitstream splitting position determining method according to the present invention.

DESCRIPTION OF REFERENCE NUMERALS

1 ... BITSTREAM CONVERSION APPARATUS
h1, h2, hn ... AUXILIARY INFORMATION
S ... BITSTREAM OF SECOND FORMAT
S1, S2, Sn ... SPLIT BITSTREAMS OF SECOND FORMAT
tx1, tx2, txn ... OVERLAPPING PORTIONS
V ... BITSTREAM OF FIRST FORMAT
V1, V2, Vn ... SPLIT BITSTREAMS OF FIRST FORMAT

BEST MODE FOR CARRYING OUT THE INVENTION

Figure 1A:
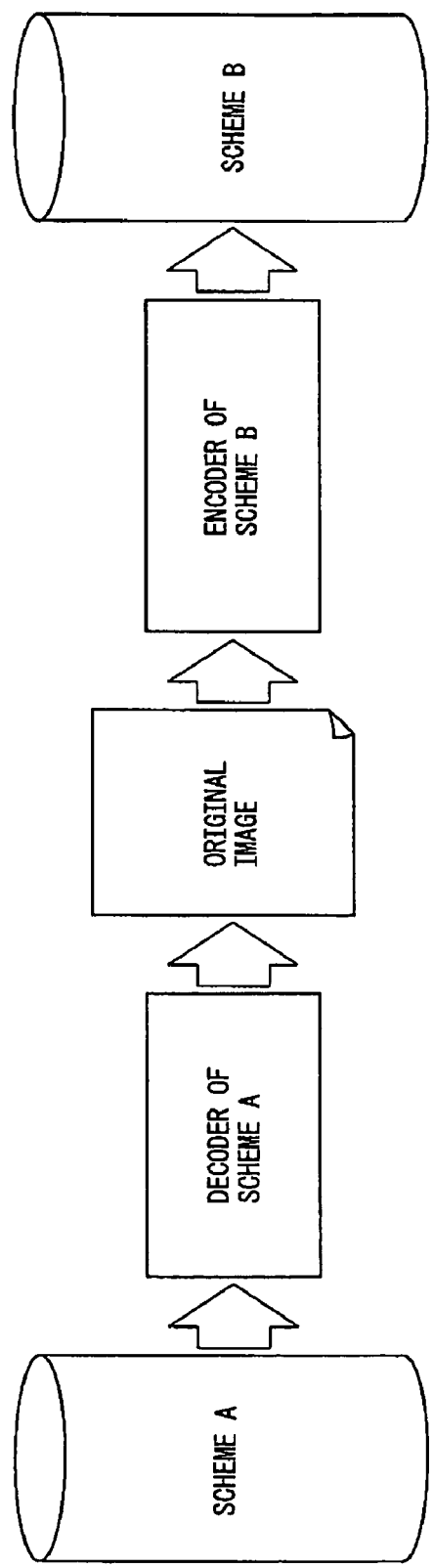
FIG. 1A is a diagram (part 1) illustrating a prior art process for converting a bitstream encoded in a given format (scheme A) into a bitstream of a different format (scheme B).
Figure 1B:
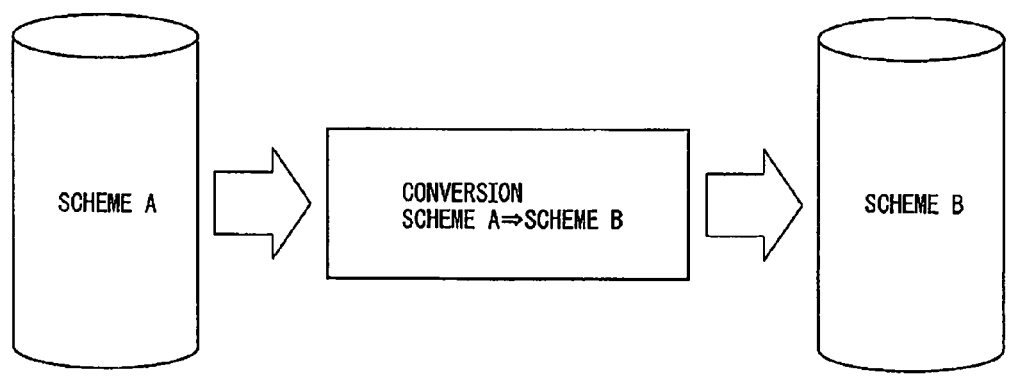
FIG. 1B is a diagram (part 2) illustrating a prior art process for converting a bitstream encoded in a given format (scheme A) into a bitstream of a different format (scheme B).
Figure 2:
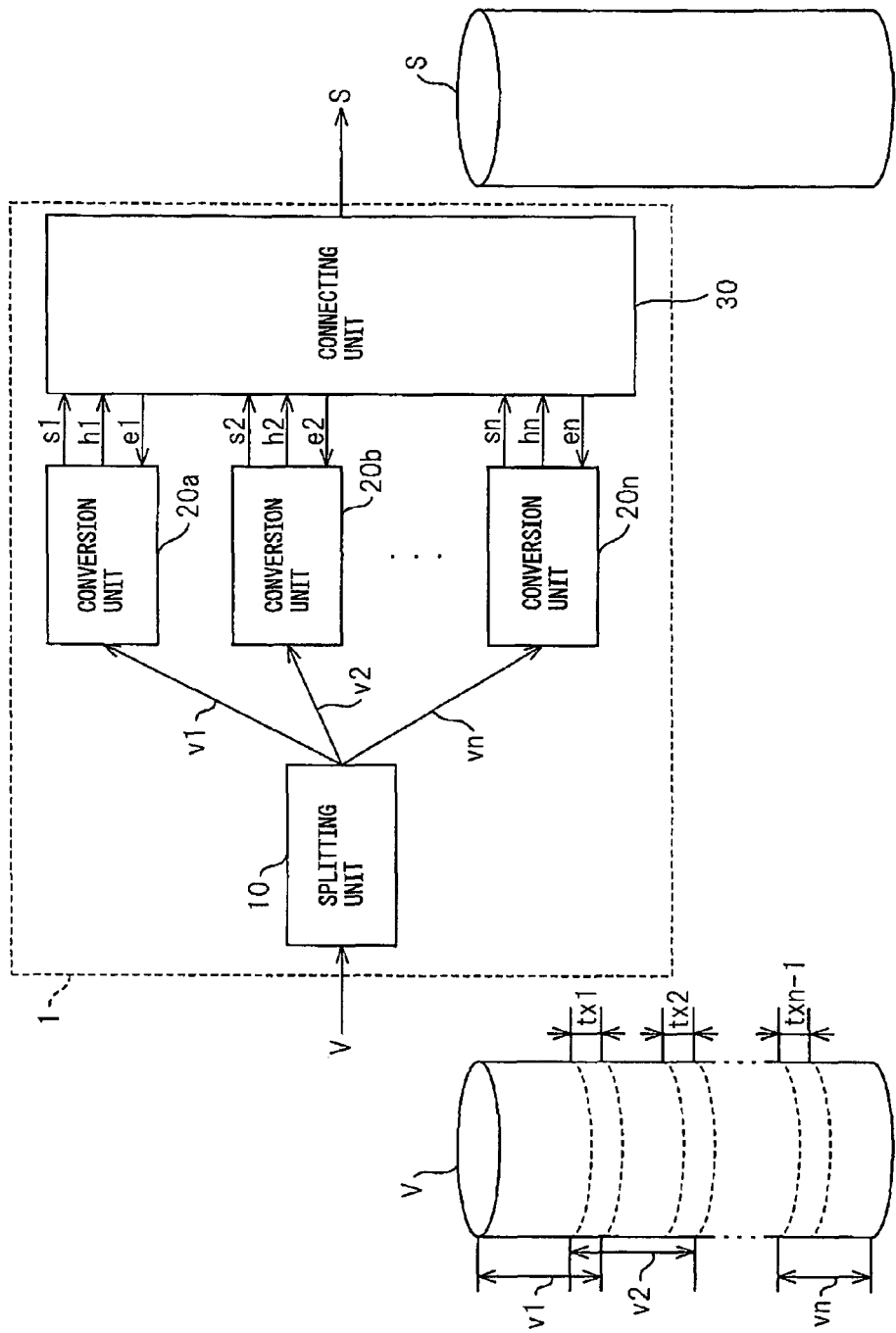
FIG. 2 is a schematic diagram illustrating the generation configuration of a bitstream conversion apparatus according to an embodiment of the present invention.

An embodiment of the present invention will be described below with reference to the accompanying drawings. FIG. 2 is a schematic diagram illustrating the generation configuration of a bitstream conversion apparatus according to the embodiment of the present invention. The bitstream conversion apparatus 1 is an apparatus for converting a bitstream V of a first format, containing a moving image stream and audio stream as content, into a bitstream S of the same content but of a second format by converting the format of the bitstream. The difference in format between the bitstream V of the first format and the bitstream S of the second format may lie, for example, in the encoding scheme used to encode the stream, the image size, or the bit rate or frame rate of the stream.

The bitstream conversion apparatus 1 includes a splitting unit 10 which splits the bitstream V of the first format in time sequential fashion into a plurality of split bitstreams v1 to vn of the first format, a plurality of conversion units 20a to 20n which convert the plurality of split bitstreams v1 to vn of the first format into a plurality of split bitstreams s1 to sn of the second format, and a connecting unit 30 which connects the plurality of split bitstreams s1 to sn of the second format to produce the bitstream S of the second format having the same content as the bitstream V of the first format but different in format. In the following description, the plurality of conversion units 20a to 20n may sometimes be referred to collectively as the conversion unit 20.

The diagram of the bitstream V depicted in FIG. 2 indicates that the plurality of split bitstreams v1 to vn of the first format, produced by the splitting unit 10, have overlapping portions between them; for example, the first split bitstream v1 and the second split bitstream v2 have an overlapping portion tx1 between them, the second split bitstream v2 and the third split bitstream (not depicted) have an overlapping portion tx2 between them, and the (n−1)th split bitstream (not depicted) and the n-th split bitstream vn have an overlapping portion txn−1 between them.

Figure 3:
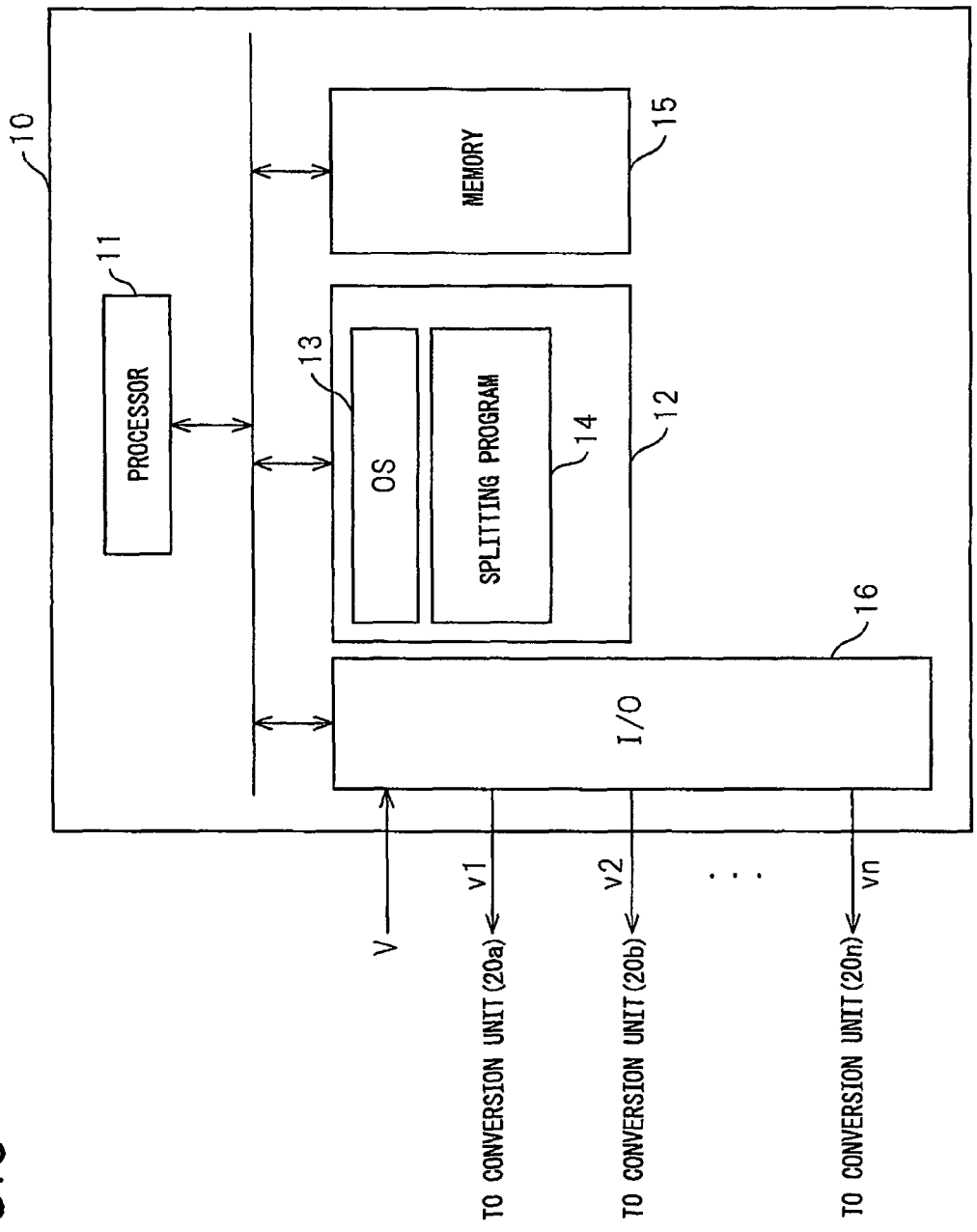
FIG. 3 is a schematic diagram illustrating the configuration of a splitting unit depicted in FIG. 2.

FIG. 3 is a schematic diagram illustrating the configuration of the splitting unit 10 depicted in FIG. 2. The hardware configuration of the splitting unit 10 can be implemented using a computer. That is, the splitting unit 10 includes a processor 11 such as a CPU, a storage unit 12 which stores an operating system (OS) 13 and other programs to be executed by the processor 11, a memory 15 into which programs to be executed by the processor 11 are loaded and in which data necessary for processing by the processor 11 are temporarily stored, and an interface (I/O) 16 which receives the bitstream V of the first format from the outside and outputs the split bitstreams v1 to vn of the first format to the respective conversion units 20a to 20n.

The storage unit 12 stores a splitting program 14 which is executed by the processor 11 and thereby causes the processor 11 to carry out the splitting process for splitting the input bitstream V of the first format into the split bitstreams v1 to vn of the first format. The details of the bitstream splitting process implemented by the splitting program 14 will be described later.

Figure 4:
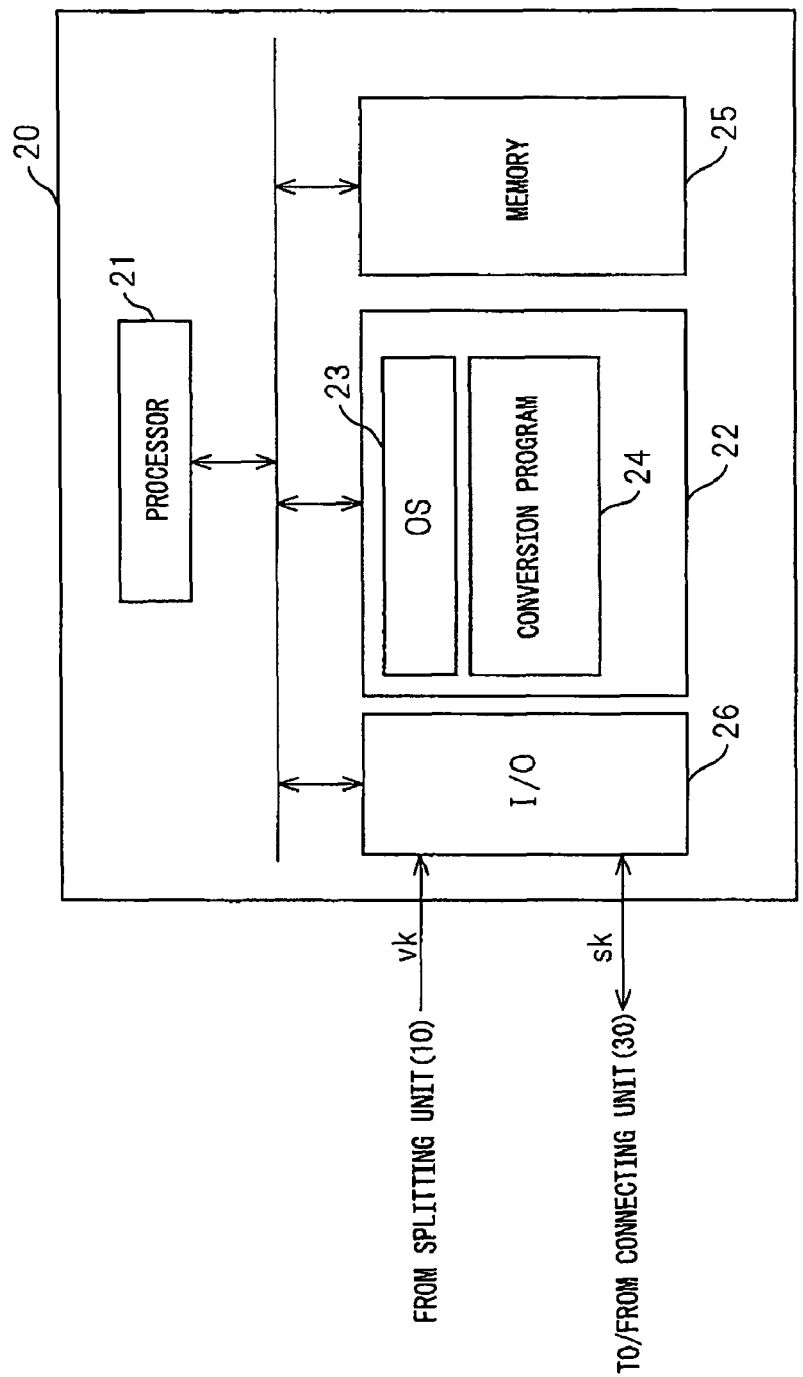
FIG. 4 is a schematic diagram illustrating the configuration of a conversion unit depicted in FIG. 2.

FIG. 4 is a schematic diagram illustrating the configuration of one of the plurality of conversion units 20 depicted in FIG. 2. The hardware configuration of the conversion unit 20 can be implemented using a computer. That is, the conversion unit 20 includes a processor 21 such as a CPU, a storage unit 22 which stores an operating system (OS) 23 and other programs to be executed by the processor 21, a memory 25 into which programs to be executed by the processor 21 are loaded and in which data necessary for processing by the processor 21 are temporarily stored, and an interface 26 which receives the slit bitstream vk, one of the split bitstreams v1 to vn of the first format, from the splitting unit 10 and supplies to the connecting unit 30 the split bitstream sk of the second format converted from the stream vk.

The storage unit 22 stores a conversion program 24 which is executed by the processor 21 and thereby causes the processor 21 to carry out the conversion process for converting the input split bitstream vk of the first format into the split bitstream sk of the second format. The details of the bitstream conversion process implemented by the conversion program 24 will be described later.

Figure 5:
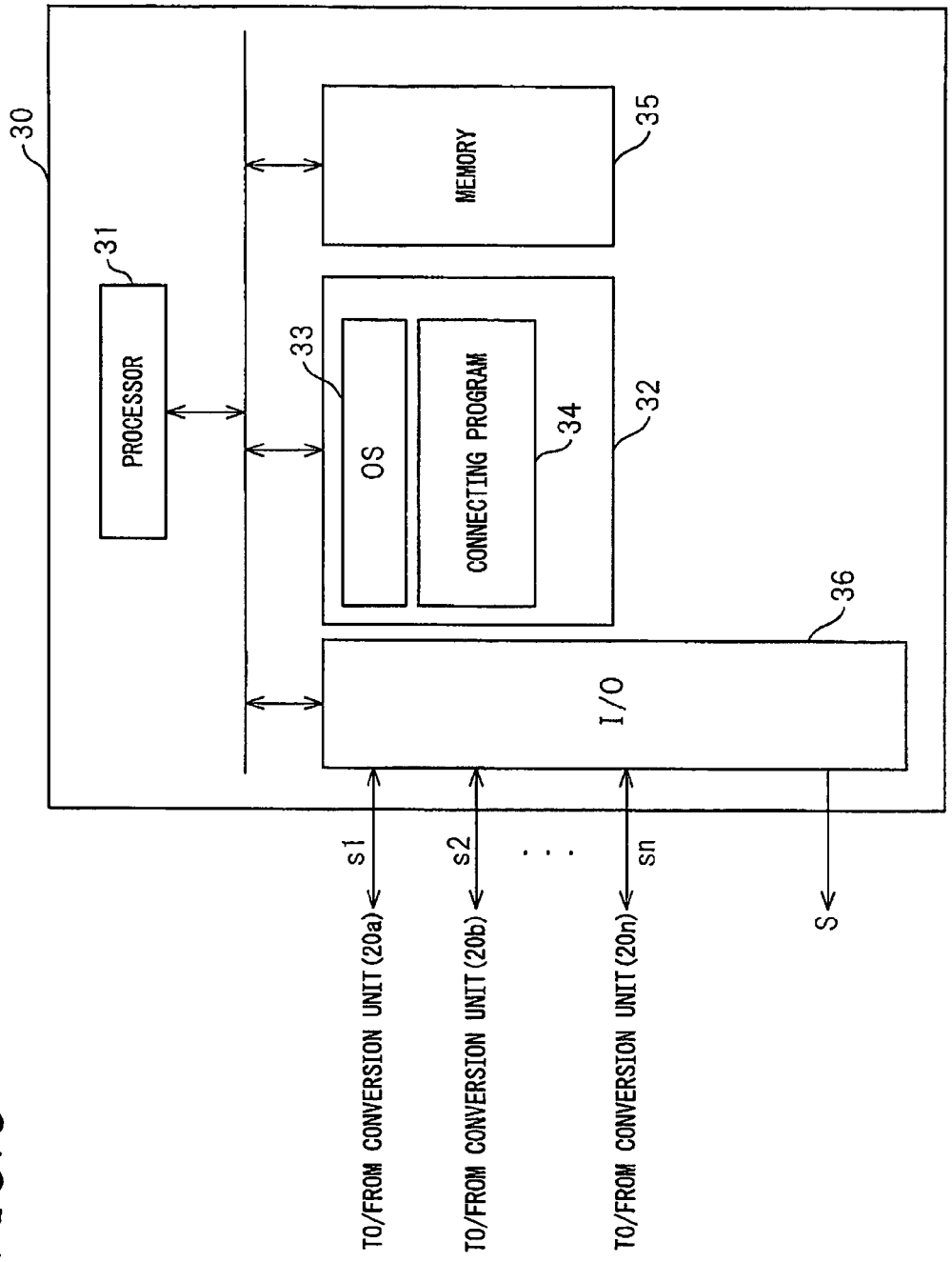
FIG. 5 is a schematic diagram illustrating the configuration of a connecting unit depicted in FIG. 2.

FIG. 5 is a schematic diagram illustrating the configuration of the connecting unit 30 depicted in FIG. 2. The hardware configuration of the connecting unit 30 can be implemented using a computer. That is, the connecting unit 30 includes a processor 31 such as a CPU, a storage unit 32 which stores an operating system (OS) 33 and other programs to be executed by the processor 31, a memory 35 into which programs to be executed by the processor 31 are loaded and in which data necessary for processing by the processor 31 are temporarily stored, and an interface 36 which receives the split bitstreams s1 to sn of the second format from the respective conversion units 20 and outputs the bitstream S of the second format.

The storage unit 32 stores a connecting program 34 which is executed by the processor 31 and thereby causes the processor 31 to carry out the connecting process for connecting the plurality of split bitstreams s1 to sn of the second format to one another and producing the bitstream S of the second format having the same content as the bitstream V of the first format but different in format. The details of the bitstream connecting process implemented by the connecting program 34 will be described later.

In the hardware configuration examples depicted in FIGS. 3 to 5, the splitting unit 10, the conversion unit 20, and the connecting unit 30 are each constructed from a separate computer, but the configuration of the bitstream conversion apparatus according to the present invention is not limited to the illustrated one. Rather, any other configuration may be employed, as long as the plurality of conversion units 20a to 20n are constructed so that the conversion processes can be performed in a parallel fashion using respectively separate processors.

Figure 6:
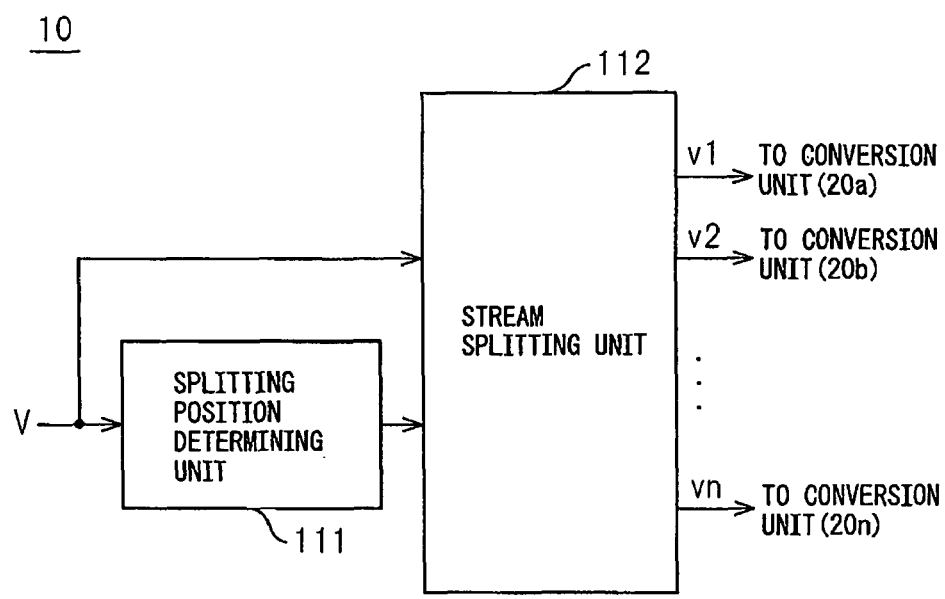
FIG. 6 is a diagram illustrating a functional block diagram implemented by the splitting unit depicted in FIG. 2.

FIG. 6 is a diagram illustrating a functional block diagram implemented by the splitting unit 10 depicted in FIG. 2. With the processor 11 depicted in FIG. 3 executing the splitting program 14, the splitting unit 10 implements a splitting position determining unit 111 which carries out a splitting position determining process for determining the splitting positions at which the bitstream V of the first format is to be split into the plurality of split bitstreams v1 to vn, and a stream splitting unit 112 which carries out the splitting process for splitting the input bitstream V of the first format at the splitting positions determined by the splitting position determining unit 111. How the bitstream is split by the splitting unit 10 will be described below.

When splitting the bitstream V of the first format into the plurality of split bitstreams v1 to vn, the splitting unit 10 determines the start position and end position of each of the split bitstreams v1 to vn so as to provide an overlapping portion between adjacent ones of the split bitstreams v1 to vn, as earlier described with reference to FIG. 2. FIG. 7 is a flowchart illustrating a first example of the bitstream splitting position determining method according to the present invention. In the illustrated example, the bitstream splitting positions are determined so that each of the split bitstreams v1 to vn contains substantially the same number of key frames. The term "key frame" used in this specification refers to the frame generated without using interframe predictive coding. An I picture in a video stream encoded in an MPEG format is an example of such a key frame.

In step S10, the splitting position determining unit 111 searches for all the image key frames contained in the bitstream V of the first format. Here, let zv denote the total number of image key frames and N the number of split bitstreams. Then, the splitting position determining unit 111 determines the tentative start position tds of the i-th split bitstream vi by taking a position somewhere between the position of the ((i−1)×(zv/N)+1)th image key frame and the position of the ((i−1)×(zv/N)+2)th image key frame (i is an integer between 1 and N).

Further, the splitting position determining unit 111 determines the tentative end position tde of the i-th split bitstream vi by taking a position somewhere between the position of the (i×(zv/N)+1)th image key frame and the position of the (i× (zv/N)+2)th image key frame.

Figure 8A:
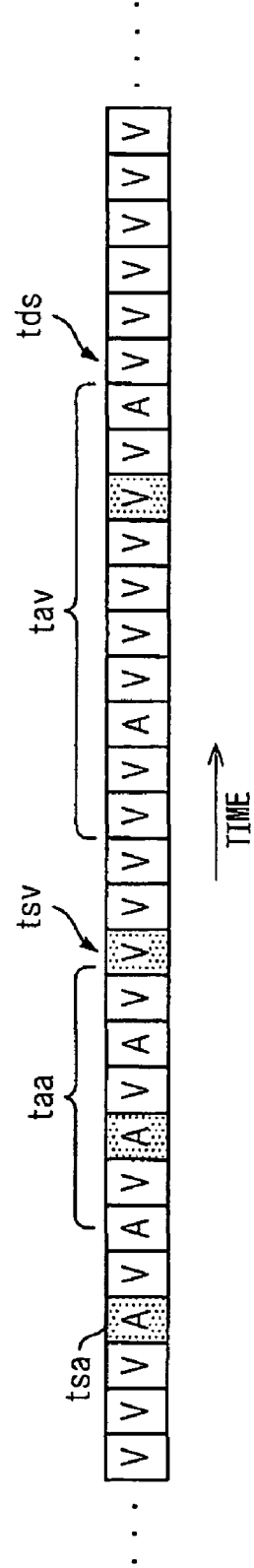
FIG. 8A is an explanatory diagram (part 1) for the bitstream splitting position determining method according to the present invention.

In step S11, the splitting position determining unit 111 determines the image stream start position tsv for each split bitstream vi. Here, the splitting position determining unit 111 determines the start position tsv by selecting the start position of the image key frame that appears earlier than the time position located a predetermined time tav back from the tentative start position tds determined in step S10. The relationship between the tentative start position tds, the start position tsv, and the predetermined time tav is depicted in FIG. 8A. Each rectangle in FIGS. 8A and 8B indicates a frame, and each frame labeled A indicates an audio frame, while each frame labeled V indicates an image frame. Each stippled frame indicates a key frame.

Figure 8B:
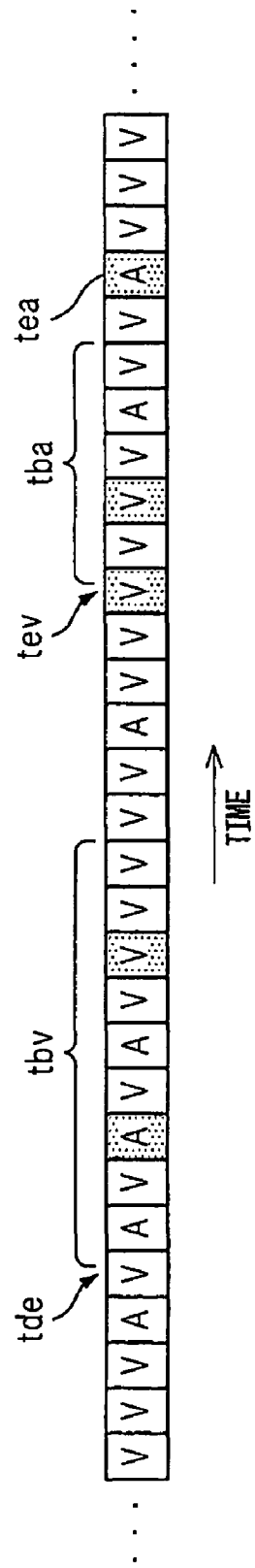
FIG. 8B is an explanatory diagram (part 2) for the bitstream splitting position determining method according to the present invention.

In step S12, the splitting position determining unit 111 determines the image stream end position tev for each split bitstream vi. The splitting position determining unit 111 determines the end position tev by selecting the position immediately preceding the start position of the image key frame that appears later than the time position advanced by a predetermined time tbv from the tentative end position tde determined in step S10. The relationship between the tentative end position tde, the end position tev, and the predetermined time tbv is depicted in FIG. 8B.

By determining the image stream start and end positions as indicated in steps S11 and S12, the temporally adjacent split streams vi and vi+1 have an overlapping portion at least equal to the predetermined times tav+tvb.

In step S13, the splitting position determining unit 111 determines the audio stream start position tsa for each split bitstream vi. The splitting position determining unit 111 determines the audio stream start position tsa by selecting the start position of the audio key frame that appears earlier than the time position located a predetermined time taa back from the image stream start position tsv determined in step S11. The relationship between the respective start positions tsa and tsv and the predetermined time taa is depicted in FIG. 8A.

In step S14, the splitting position determining unit 111 determines the audio stream end position tea for each split bitstream vi. The splitting position determining unit 111 determines the audio stream end position tea by selecting the start position of the audio key frame that appears later than the time position advanced by a predetermined time tba from the image stream end position tev determined in step S12. The relationship between the respective end positions tea and tev and the predetermined time tba is depicted in FIG. 8B.

When the audio stream start and end positions are determined as indicated in steps S13 and S14, the audio stream in each split stream has a longer overlapping portion than the image stream has. The reason for making the overlapping portion longer for the audio stream than that for the image stream is that the human perception is more sensitive to a disturbance in audio than to a disturbance in image. That is, by making the overlapping portion longer for the audio stream, it becomes possible to make audio processing easier for connecting one audio stream to another in a natural way.

The stream splitting unit 112 produces the split streams v1 to vn of the first format by segmenting the respective split bitstreams from the bitstream V of the first format based on the start and end positions determined by the split position determining unit 111.

Figure 9:
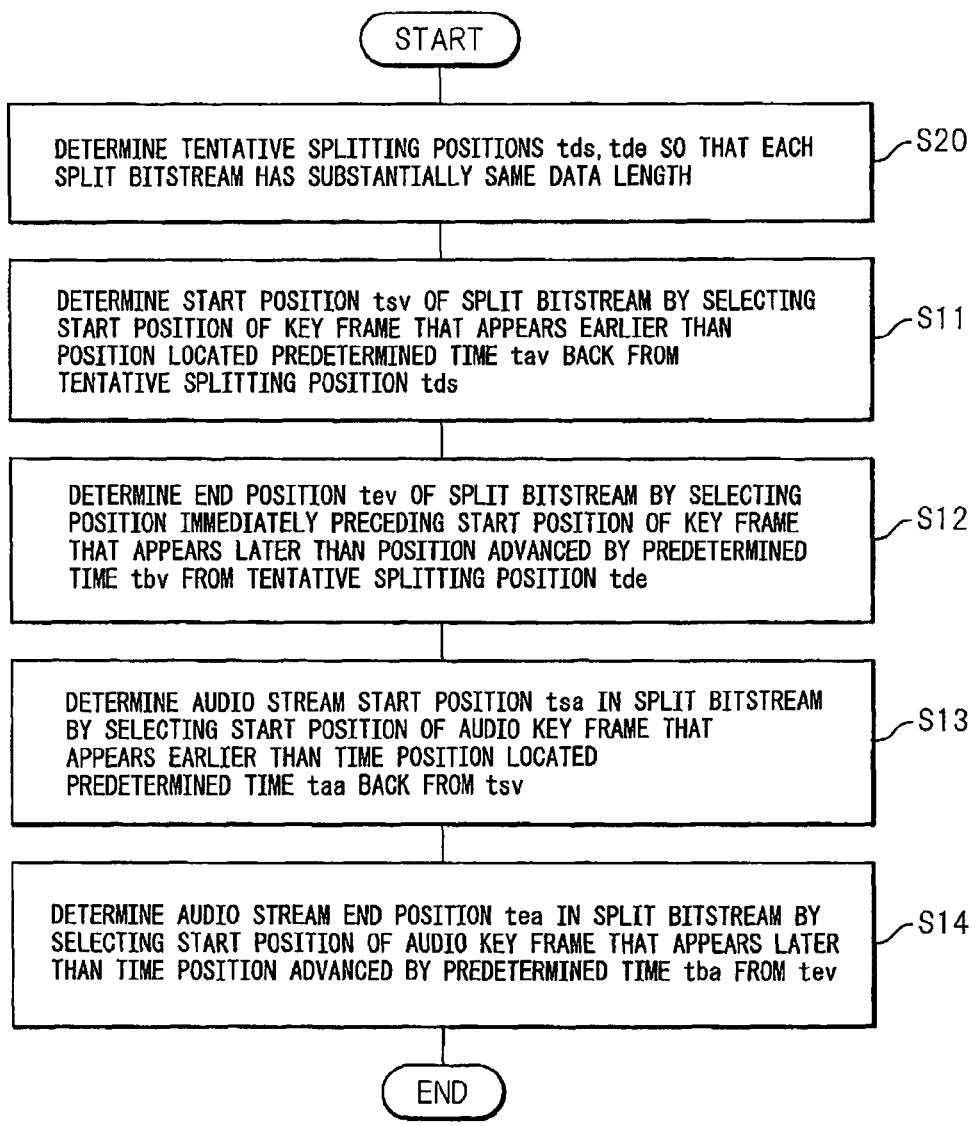
FIG. 9 is a flowchart illustrating a second example of the bitstream splitting position determining method according to the present invention.

FIG. 9 is a flowchart illustrating a second example of the bitstream splitting position determining method according to the present invention. In the example illustrated in FIG. 9, the bitstream splitting positions are determined so that each of the split bitstreams v1 to vn has substantially the same data length (number of bits).

In step S20, the splitting position determining unit 111 determines the ((i−1)×(L/N)+1)th bit position in the bitstream as the tentative start position tds of the i-th split bitstream vi (i is an integer between 1 and N). L denotes the total number of bits in the bitstream V, and N the number of bitstreams into which the bitstream V is split.

Further, the splitting position determining unit 111 determines the (i×(L/N)+1)th bit position in the bitstream as the tentative end position tde of the i-th split bitstream vi. After that, the splitting position determining unit 111 determines the start and end positions of each slit bitstream in the same manner as in steps S11 to S14 of the flowchart illustrated in FIG. 7.

Figure 10:
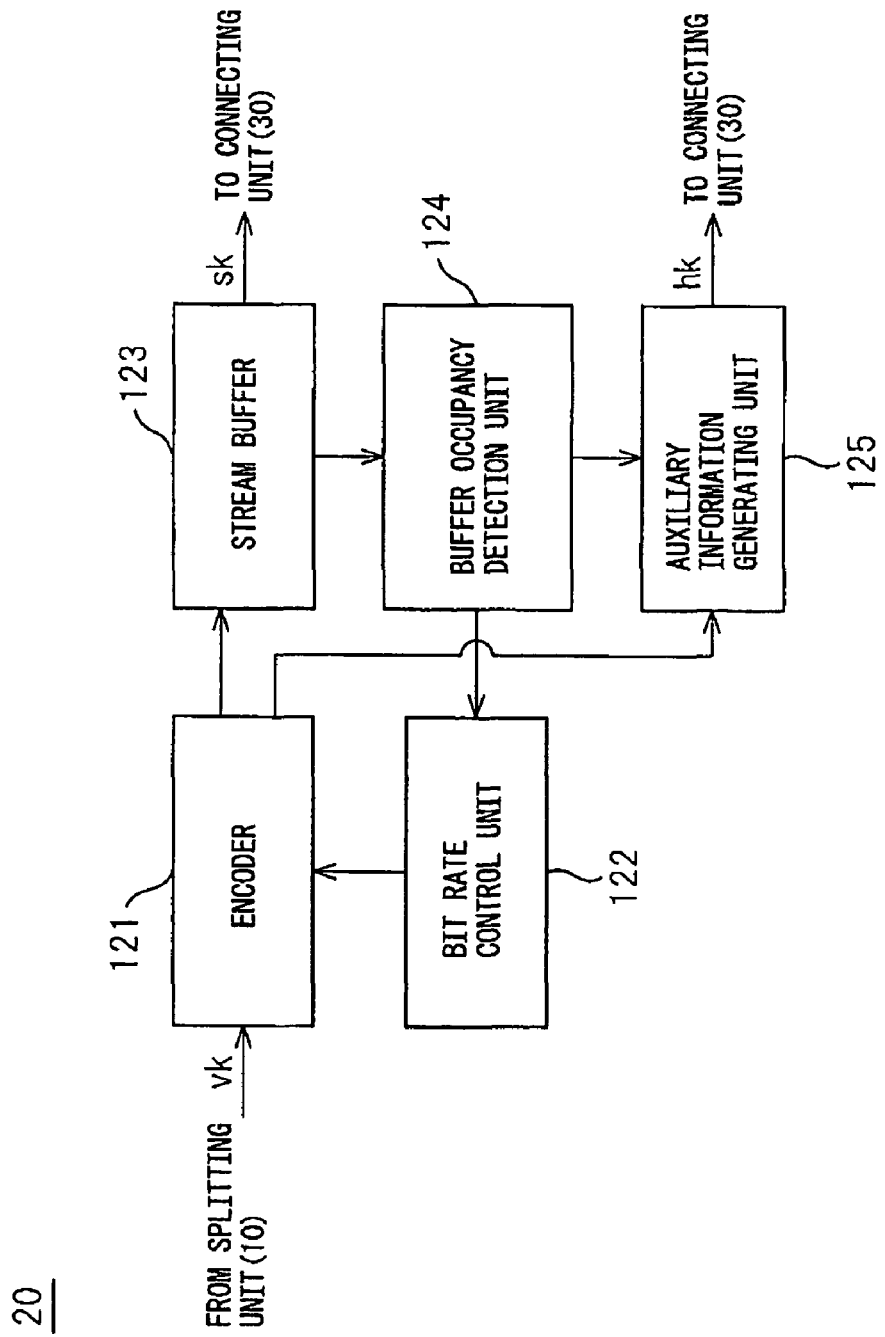
FIG. 10 is a diagram illustrating a first example of a functional block diagram implemented by the conversion unit depicted in FIG. 2.

FIG. 10 is a diagram illustrating a first example of a functional block diagram implemented by the conversion unit 20 depicted in FIG. 2. With the processor 21 depicted in FIG. 4 executing the conversion program 24, the conversion unit 20 implements an encoder 121 which converts the split bitstream vk of the first format (k is an integer between 1 and n) into the bitstream sk of the second format, a bit rate control unit 122 which controls the bit rate as the encoder 121 generates the bitstream sk of the second format, a buffer occupancy detection unit 124 which detects the occupancy of a stream buffer 123 which is a memory area allocated as a speed smoothing memory within the memory 25, and an auxiliary information generating unit 125 which generates prescribed auxiliary information hk described hereinafter.

The auxiliary information hk is generated for each image key frame in the bitstream sk of the second format. Since the split bitstreams v1 to vn of the first format to be converted by the conversion units 20 have overlapping portions tx1 to txn, the split bitstreams sk converted to the second format also have overlapping portions. The auxiliary information generating unit 125 may generate the auxiliary information hk only for the image key frames contained in the overlapping portions of the split bitstreams sk of the second format.

The auxiliary information hk may be information indicating the amount of information produced when generating each corresponding image frame. Such information includes, for example, the amount of information hkf produced when the encoder 121 processes the image frame, the occupancy hkv of the stream buffer 123 (hereinafter referred to as "buffer occupancy"), etc.

The auxiliary information hk may also be image quality information hkq that indicates the image quality of each corresponding image frame. Such information includes, for example, information on the quantization step size used for encoding of the image frame by the encoder 121, information on coding errors, information on the distribution of coefficients, such as DCT coefficients, generated by intraframe coding, etc. When the image frame is encoded by dividing it into smaller segments such as macroblocks, the image quality information hkq may be generated as a combination of numeric values one for each macroblock, or may be generated by taking the average value of all the macroblocks contained in the image frame.

Further, the auxiliary information hk may be similarity metric information hks that provides a measure of similarity between corresponding image frames. Such information includes motion vector information generated for each image frame.

The auxiliary information generating unit 125 generates the auxiliary information hk by receiving the necessary information from the buffer occupancy detection unit 124 and the encoder 121 in accordance with the contents of the auxiliary information hk to be created.

Figure 11:
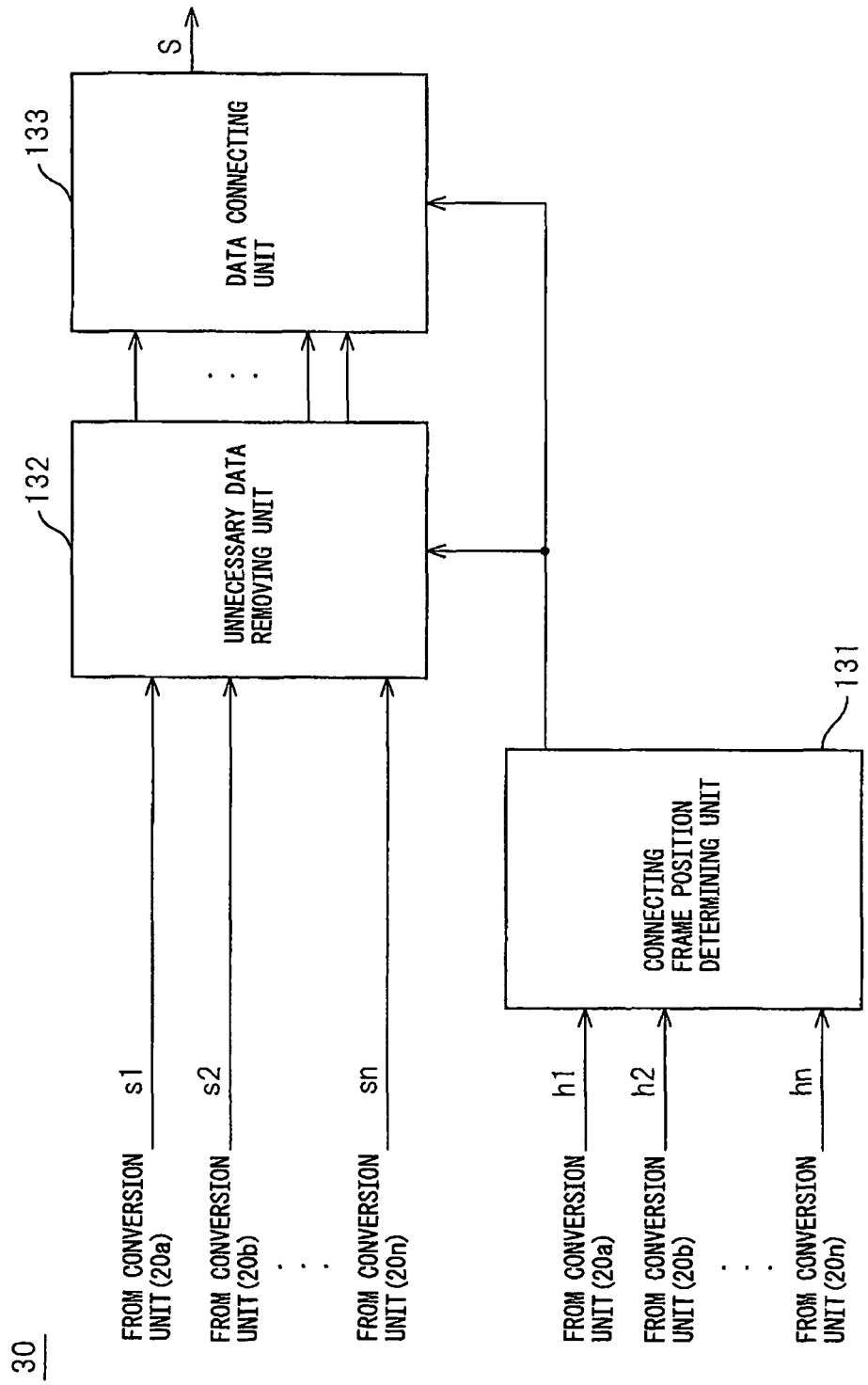
FIG. 11 is a diagram illustrating a first example of a functional block diagram implemented by the connecting unit depicted in FIG. 2.

FIG. 11 is a diagram illustrating a first example of a functional block diagram implemented by the connecting unit 30 depicted in FIG. 2. With the processor 31 depicted in FIG. 5 executing the connecting program 34, the connecting unit 30 implements a connecting frame position determining unit 131 which, based on the auxiliary information h1 to hn received from the respective conversion units 20a to 20n, determines the connecting frame positions at which the split bitstreams s1 to sn of the second format, having overlapping portions and received from the respective conversion units 20a to 20n, are to be connected, an unnecessary data removing unit 132 which removes unnecessary data from the overlapping portions of the split bitstreams s1 to sn of the second format, and a data connecting unit 133 which produces the bitstream S of the second format by connecting together the split bitstreams s1 to sn from which the unnecessary data have been removed.

The connecting frame position determining unit 131 determines, from among the positions along the overlapping portion of each pair of temporally adjacent split bitstreams, the connecting frame position, i.e., the key frame position, at which the two split bitstreams are to be connected.

For each of the split bitstreams s1 to sn of the second format, the unnecessary data removing unit 132 removes the portion between an end of the split bitstream and the connecting frame position, thereby eliminating the overlapping portions between the respective split bitstreams s1 to sn.

Figure 12:
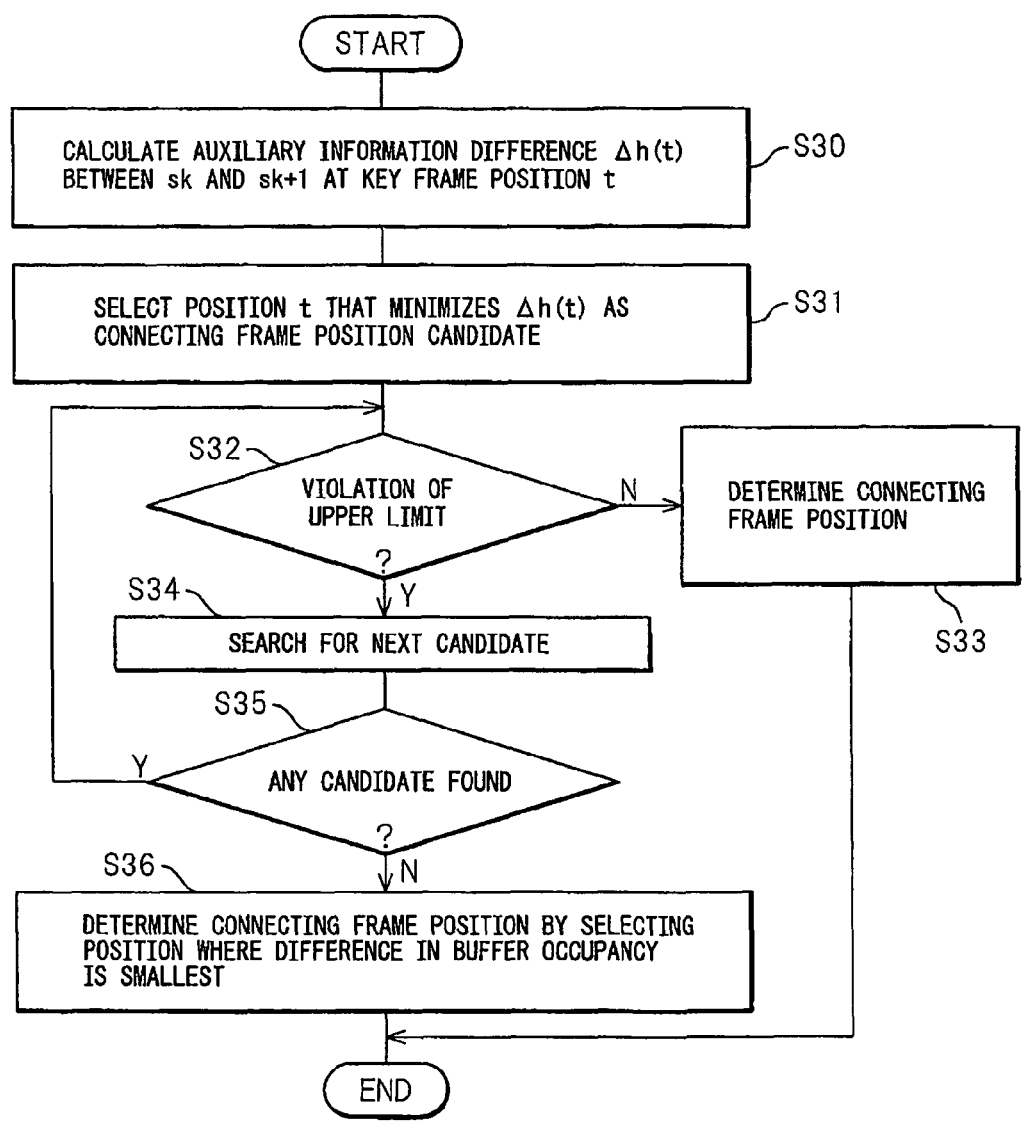
FIG. 12 is a flowchart illustrating a first example of a bitstream connecting method according to the present invention.

The bitstream connecting method according to the present invention will be described below. The following description is given by assuming the case of connecting the temporally adjacent two split bitstreams sk and sk+1. FIG. 12 is a flowchart illustrating a first example of the bitstream connecting method according to the present invention.

In step S30, the connecting frame position determining unit 131 calculates the difference Δh between the auxiliary information hsk generated for the stream sk and the auxiliary information hsk+1 generated for the stream sk+1.

The auxiliary information hsk and the auxiliary information hsk+1, respectively, are generated for each key frame contained in the overlapping portion of the two streams sk and sk+1. In the following description, the time t or position t of each frame in the bitstream V of the first frame before splitting will be indicated by using the time or position at which the frame is played back when the bitstream V is played back continuously from the start through to the end. The time or position of each frame in the split bitstreams s1 to sn of the second format will also be indicated by using the time or position of that frame in the source bitstream V of the first format. The auxiliary information generated for a key frame at a given time t is designated as hsk(t) and hsk+1(t), respectively.

Figure 13:
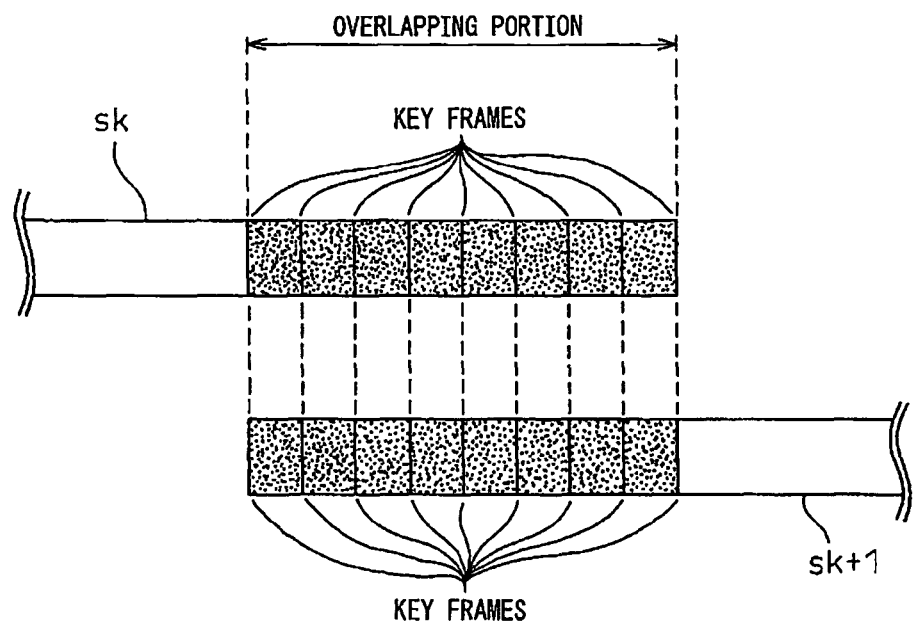
FIG. 13 is an explanatory diagram for the bitstream connecting method illustrated in FIG. 12.

As previously described, the splitting unit 10 splits the bitstream V of the first format at key frame positions. Accordingly, when the split bitstreams are converted by the conversion units 20 without changing the positions of the image key frames or in such a manner that the frequency of occurrence of image key frames in the split bitstreams s1 to sn of the second format becomes equal to an integral multiple of the frequency of occurrence of image key frames in the split bitstreams v1 to vn of the first format, the image key frames in the overlapping portion align with each other between the two split bitstreams sk and sk+1, as depicted in FIG. 13.

The connecting frame position determining unit 131 calculates the difference Δh(t) of the auxiliary information for each key frame. For example, when the auxiliary information hsk(t) includes the amount of information hskf(t) generated when the key frame at time t was generated, the buffer occupancy hskv(t) at time t, the key frame image quality information hskq(t) at time t, and the key frame similarity metric information hsks(t) at time t, and when the auxiliary information hsk+1(t) includes the amount of information hsk+1f(t) generated when the key frame at time t was generated, the buffer occupancy hsk+1v(t) at time t, the key frame image quality information hsk+1q(t) at time t, and the key frame similarity metric information hsk+1s(t) at time t, then the difference Δh(t) may be calculated by the following equation (1).

$$\Delta h(t) = \alpha \times \Delta hf(t) + \beta \times \Delta hv(t) + \gamma \times \Delta hq(t) + \eta \times \Delta hs(t) \quad (1)$$

Here, $\alpha$, $\beta$, $\gamma$, and $\eta$ are predetermined constants, and the variables are given as $$\Delta hf(t) = |hskf(t) - hsk+1f(t)| \quad (2)$$

$$\Delta hv(t) = |hskv(t) - hsk+1v(t)| \quad (3)$$

$$\Delta hq(t) = |hskq(t) - hsk+1q(t)| \quad (4)$$

$$\Delta hs(t) = |hsks(t) - hsk+1s(t)| \quad (5)$$

In step S31, the connecting frame position determining unit 131 searches for a key frame position that minimizes the auxiliary information difference Δh(t) from among the key frame positions contained in the overlapping portion of the bitstreams sk and sk+1, and takes the thus found position (time) t as a candidate for the connecting frame position.

In step S32, the connecting frame position determining unit 131 determines whether, when the bitstreams sk and sk+1 are connected at the connecting frame candidate position t, the resulting bitstream causes an overflow or not, i.e., whether or not the amount of information at any given point on the bitstream exceeds a buffer occupancy upper limit value predefined for the buffer provided as a speed smoothing memory. In the following description, the phrase "causes an overflow" or "an overflow occurs" may be used to refer to the situation where the amount of information at any given point on the bitstream exceeds and thus violates the predefined upper limit value of the buffer occupancy.

The connecting frame position determining unit 131 can make the above determination, for example, in the following manner. Denoting the connecting position by a, then from the auxiliary information hsk(a) generated for the key frame at time a in the bitstream sk, the connecting frame position determining unit 131 can determine the buffer occupancy hskv(a) that occurred at time a when the bitstream sk was encoded.

Further, based on the difference between the buffer occupancy hsk+1v(a) that occurred at time a when the bitstream sk+1 was encoded and the buffer occupancy hsk+1v(b) that occurred at subsequent time b when the bitstream sk+1 was encoded, the connecting frame position determining unit 131 can calculate the amount of information generated during the period from time a to time b when the bitstream sk+1 was encoded.

Accordingly, based on the buffer occupancy hskv(a) that occurred at time a when the bitstream sk was encoded and the buffer occupancies hsk+1v(a) and hsk+1v(b) that respectively occurred at times a and b when the bitstream sk+1 was encoded, the connecting frame position determining unit 131 can calculate the buffer occupancy hv(b) that occurs at time b when the bitstreams sk and sk+1 are connected at time a.

The connecting frame position determining unit 131 determines whether an overflow occurs or not by monitoring the thus calculated buffer occupancy hv(b) for a predetermined period from time a and by checking whether the buffer occupancy hv(b) exceeds the predefined upper limit value during that period.

If it is determined in step S32 that an overflow does not occur, the connecting frame position determining unit 131 determines the candidate position checked in step S32 as the connecting frame position (step S33). If it is determined in step S32 that an overflow occurs, the process proceeds to step S34.

In step S34, the connecting frame position determining unit 131 searches for the next connecting frame position candidate by searching for a key frame position that minimizes $\Delta h(t)$ from among the key frame positions contained in the overlapping portion of the bitstreams sk and sk+1 but excluding any key frame position previously chosen as the connecting frame position candidate.

When the next connecting frame position candidate is found (step S35), the candidate is checked in step S32, and the process from step S32 to step S35 is repeated until no more candidate is found.

When the determination in step S32 has been made on all the key frames contained in the overlapping portion of the bitstreams sk and sk+1, but it has not been possible to find a position that does not cause an overflow, then in step S36 the connecting frame position determining unit 131 determines the connecting frame position by selecting the key frame position where the difference between the buffer occupancy hskv(t) that occurred when the bitstream sk was encoded and the buffer occupancy hsk+1v(t) that occurred when the bitstream sk+1 was encoded is the smallest, thus minimizing information loss due to the overflow.

Figure 14:
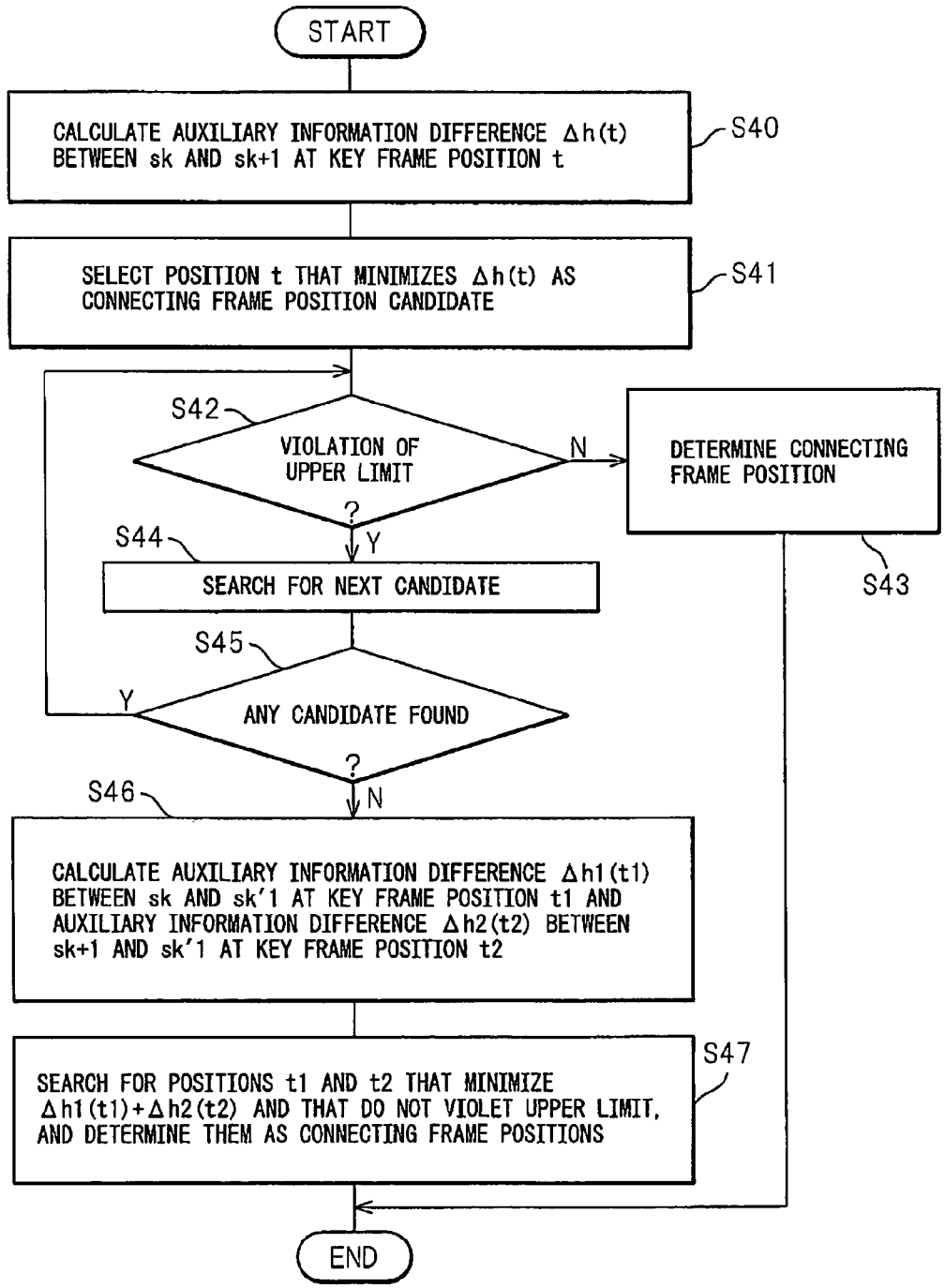
FIG. 14 is a flowchart illustrating a second example of the bitstream connecting method according to the present invention.
Figure 15:
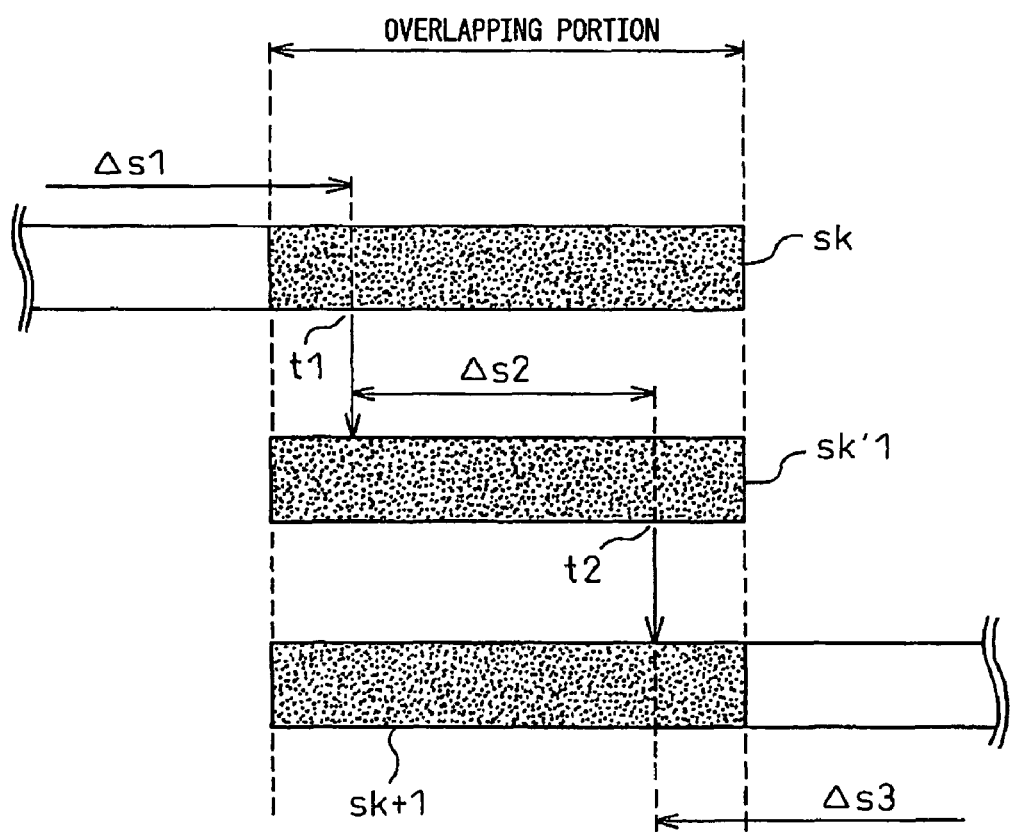
FIG. 15 is an explanatory diagram for the bitstream connecting method illustrated in FIG. 14.

FIG. 14 is a flowchart illustrating a second example of the bitstream connecting method according to the present invention. The method of the second example uses a larger number of candidate positions as the candidates for the connecting frame position for connecting the bitstreams sk and sk+1. For this purpose, the conversion unit 20 not only converts the split bitstreams vk and vk+1 of the first format into the split bitstreams sk and sk+1 of the second format, but also converts a sub-bitstream vk'1 contained in the overlapping portion of the split bitstreams vk and vk+1 into a sub-bitstream sk'1 of the second format. The relationship between the bitstreams sk and sk+1 and the sub-bitstream sk'1 contained in their overlapping portion is depicted in FIG. 15.

For each pair of temporally successive bitstreams (sk and sk+1), a plurality of sub-bitstreams sk'1, sk'2, etc., contained in the overlapping portion of the bitstreams may be generated. Such a plurality of sub-bitstreams sk'1, sk'2, etc., may be generated, for example, by varying the section or its length or the bit rate used when converting to the second format.

In the following description, the position of each frame contained in the sub-bitstream sk'1 will also be indicated by using the time at which the frame is played back in the source bitstream V of the first format.

The conversion unit 20 also generates auxiliary information hsk'1(t), hsk'2(t), etc. for each image key frame contained in the respective sub-bitstreams sk'1, sk'2, etc.

In steps S40 to S45 depicted in FIG. 14, as in steps S30 to S35 in the connecting method illustrated in FIG. 12, the connecting frame position determining unit 131 searches for a connecting frame position at which the bitstreams sk and sk+1 are to be directly connected together.

If the connecting frame position at which the bitstreams sk and sk+1 are to be directly connected together has not been found, the connecting frame position determining unit 131 calculates in step S46 the difference $\Delta h1(t1)$ between the auxiliary information hsk(t1) for the bitstream sk and the auxiliary information hsk'1(t1) for the sub-bitstream sk'1 at a given key frame position t1 (depicted in FIG. 15). Further, the connecting frame position determining unit 131 calculates the difference $\Delta h2(t2)$ between the auxiliary information hsk'1(t2) for the sub-bitstream sk'1 and the auxiliary information hsk+1(t2) for the bitstream sk+1 at a position t2 (depicted in FIG. 15) occurring later than the position t1. Here, $\Delta h1(t1)$ and $\Delta h2(t2)$ may be calculated in the same manner as the auxiliary information difference $\Delta h(t)$ between the bitstreams sk and sk+1 as calculated in accordance with the earlier given equations (1) to (5).

In step S47, the connecting frame position determining unit 131 searches for positions such that $\Delta h1(t1)+\Delta h2(t2)$ is minimized and such that an overflow does not occur if the bitstream sk and the sub-bitstream sk'1 is connected at position t1 and the sub-bitstream sk'1 and the bitstream sk+1 are connected at position t2, and determines these positions t1 and t2 as the connecting frame positions.

If two or more sub-bitstreams sk'1, sk'2, etc. can be used, the connecting frame positions that minimize the auxiliary information difference may be determined by repeating the steps S46 and S47 for each sub-bitstream.

When the two frame positions t1 and t2 are determined as the connecting frame positions by using the sub-bitstream sk'1 as described above, the data connecting unit 133 connects the bitstream sk and the sub-bitstream sk'1 at the position t1 and the sub-bitstream sk'1 and the bitstream sk+1 at the position t2, as illustrated in FIG. 15. The resulting stream S therefore contains the portion $\Delta s1$ preceding t1 in the bitstream sk, the portion $\Delta s2$ from t1 to t2 in the sub-bitstream sk'1, and the portion $\Delta s3$ succeeding t2 in the bitstream sk+1.

Figure 16:
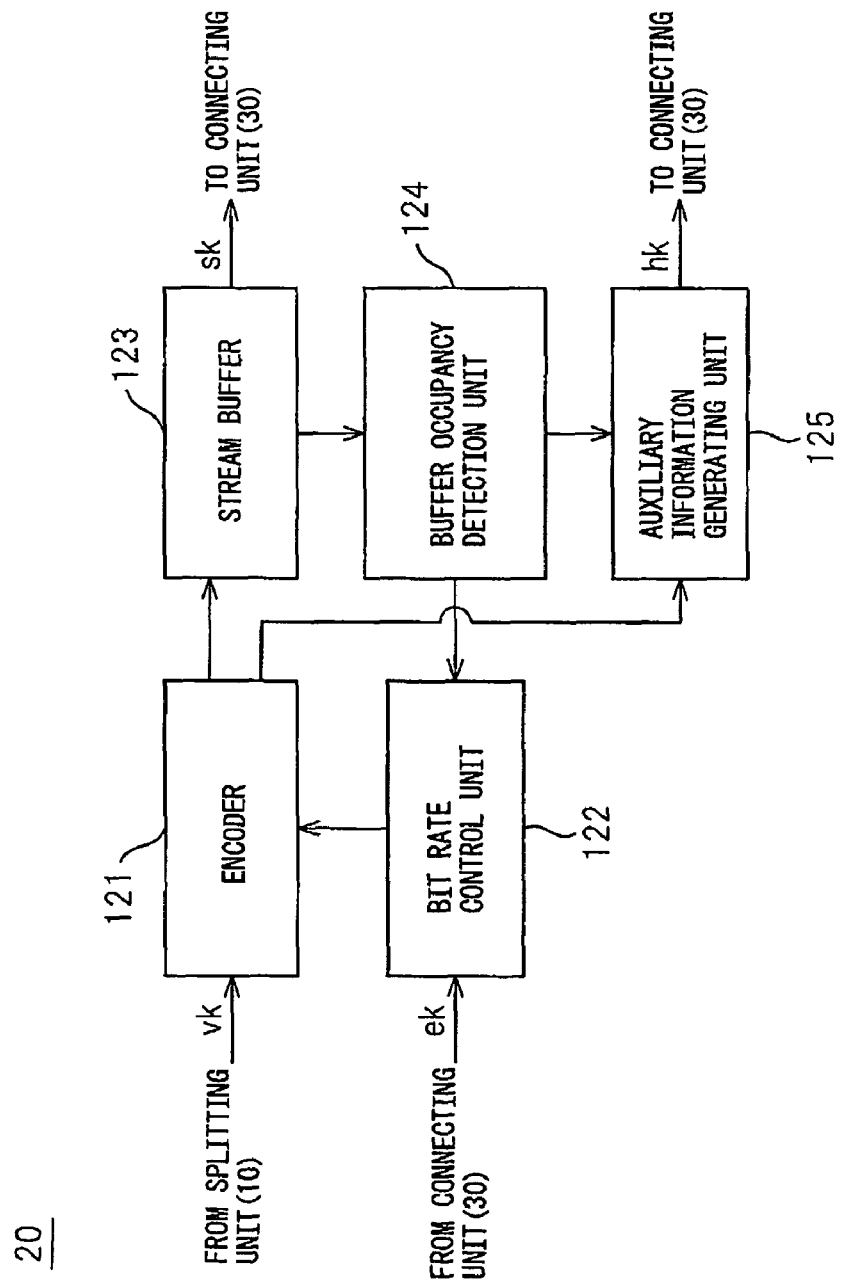
FIG. 16 is a diagram illustrating a second example of a functional block diagram implemented by the conversion unit depicted in FIG. 2.
Figure 17:
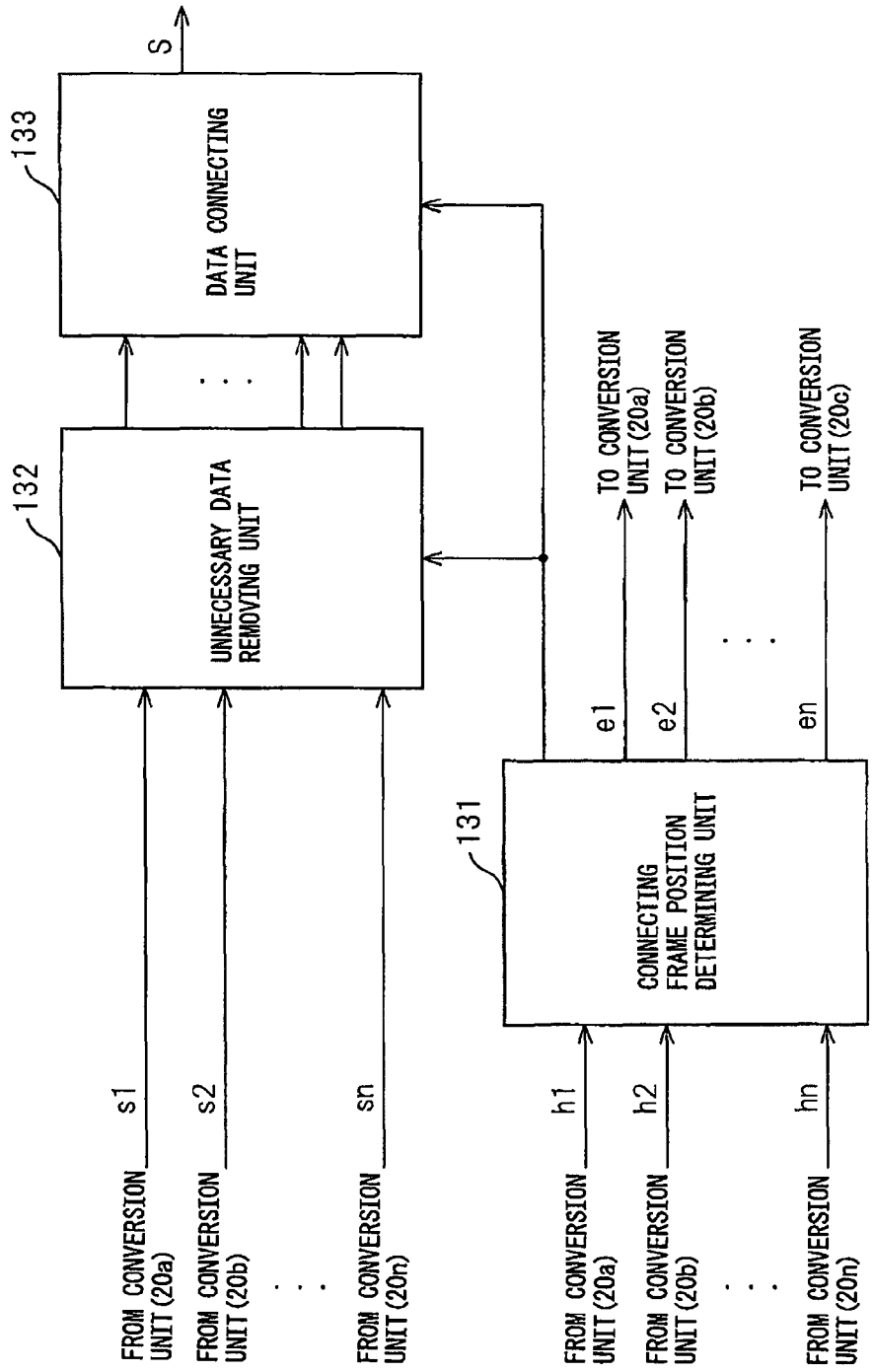
FIG. 17 is a diagram illustrating a second example of a functional block diagram implemented by the connecting unit depicted in FIG. 2.

FIG. 16 is a diagram illustrating a second example of a functional block diagram implemented by the conversion unit 20 depicted in FIG. 2, and FIG. 17 is a diagram illustrating a second example of a functional block diagram implemented by the connecting unit 30 depicted in FIG. 2. In the illustrated example, if it is determined in step S35 in the flowchart of FIG. 12 that an overflow occurs no matter what position is selected for connecting the bitstreams sk and sk+1, the conversion from the first format to the second format is redone for the bitstream in the overlapping portion of the bitstreams sk and sk+1.

For this purpose, if the occurrence of an overflow is detected when determining a connecting position in a given overlapping portion, the connecting frame determining unit 131 depicted in FIG. 17 outputs error information ek indicating the occurrence of the overflow to the corresponding conversion unit 20 that performed the conversion of the bitstream in that given overlapping portion.

Suppose here that when determining the connecting position for connecting the bitstreams sk and sk+1, the connecting frame position determining unit 131 realizes that an overflow occurs no matter what key frame in the overlapping portion P is selected as the connecting position.

The error information ek issued in this case includes at least the buffer occupancy hskv(a) and key frame image quality information hskq(a) generated for the key frame contained in the bitstream sk at the start position a of the overlapping portion P, and the buffer occupancy hsk+1v(b) and key frame image quality information hsk+1q(b) generated for the key frame contained in the bitstream sk+1 at the end position b of the overlapping portion P.

When the error information ek is received, the conversion unit 20 depicted in FIG. 16 redoes the encoding of the portion from a to b of the already input split bitstream of the first format. At this time, the bit rate control unit 122 performs overflow control so that the occupancy of the stream buffer 123 at the end of the encoding process becomes equal to the buffer occupancy hsk+1v(b) given by the error information ek, assuming that the occupancy of the stream buffer 123 at the beginning of the encoding process is equal to the buffer occupancy hskv(a) given by the error information ek.

Further, when redoing the conversion, the bit rate control unit 122 performs bit rate control so that the image quality information generated for the key frame at the start position a of the bitstream in the overlapping portion P becomes equal to the image quality information hskq(a) given by the error information ek and so that the image quality information generated for the key frame at the end position b becomes equal to the image quality information hsk+1q(b) given by the error information ek. That is, the image qualities at the start position a and end position b of the bitstream in the overlapping portion obtained by redoing the conversion are made to match the image qualities of the respective bitstreams sk and sk+1 of the second format, thereby making the variation in image quality at the connecting positions a and b less noticeable.

In this way, when performing the conversion of the bitstream in the overlapping portion P, the bit rate of the bitstream encoded by the encoder 121 is controlled by the bit rate control unit 122 so that the difference in the occupancy of the stream buffer 123 between the start position a and end position b of the overlapping portion P becomes equal to (hsk+1v(b)−hskv(a)) and so that the image quality information at the start position a of the overlapping portion P becomes equal to the image quality information hskq(a) while, on the other hand, the image quality information at the end position b becomes equal to the image quality information hsk+1q(b).

Figure 18:
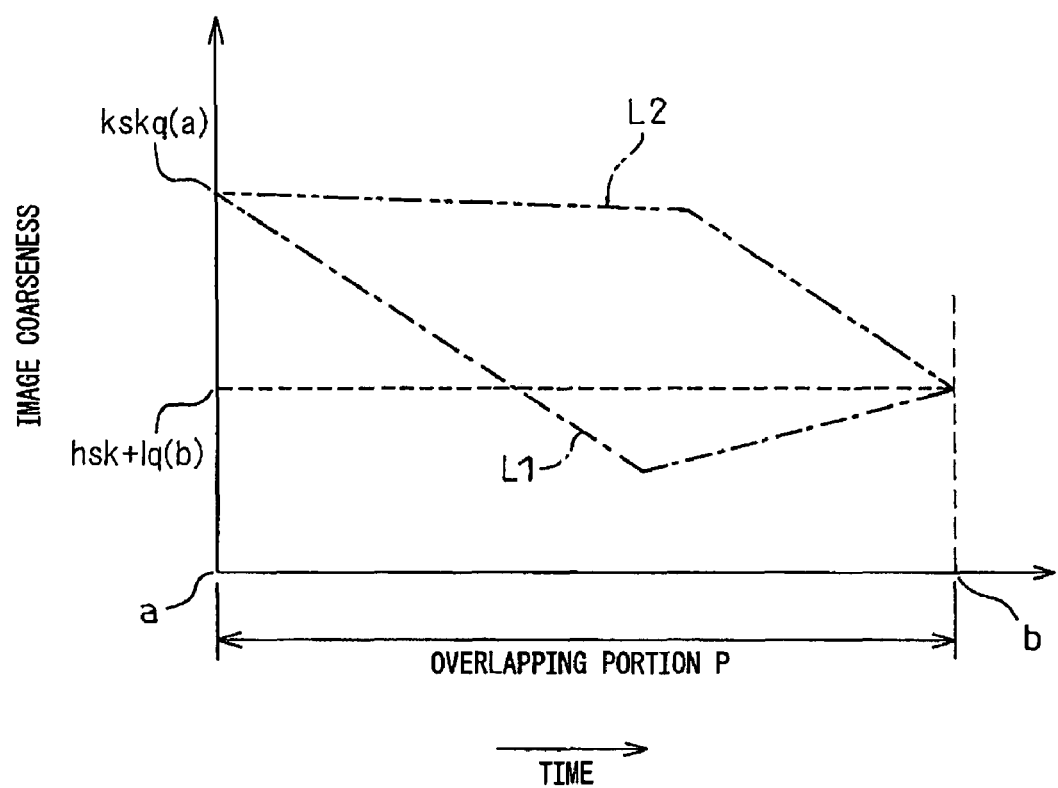
FIG. 18 is an explanatory diagram illustrating how a conversion is redone according to the present invention.

The bit rate control unit 122 needs to perform control so that the image qualities at the start and end positions a and b match the image qualities specified by the respective image quality information hskq(a) and hsk+1q(b) given by the error information ek, while at the same time, controlling the amount of information occurring in the section between the start and end positions a and b of the overlapping portion P. The amount of information that occurs in the section from the start position a to the end position b may be varied by continuously varying the image quality along the way as depicted in FIG. 18 (that is, by varying the bit rate). In the illustrated example in which the two bitstreams are encoded by varying the image quality along the way as indicated by a semi-dashed line and a double-dashed line, respectively, the image qualities at the start and end positions a and b become equal to the respective image quality information hskq(a) and hsk+1q(b), whereas the amount of information that occurs in the section from a to b differs.

While the present invention has been described in detail above with reference to the preferred embodiments, it should be understood by those skilled in the art that various modifications and changes can be made by anyone skilled in the art, and that all of such modifications and changes that come within the range of the true spirit and purpose of the present invention fall within the scope of the present invention as defined by the appended claims.

INDUSTRIAL APPLICABILITY

The present invention is applicable to media signal encoding techniques for compressing moving image signals and audio signals by exploiting spatial and temporal correlation inherently present in the moving image signals and temporal correlation inherently present in the audio signals. The invention is particularly applicable to stream conversion techniques for converting a bitstream containing a moving image stream and an audio stream from one format to another.

What is claimed is:

1. A bitstream conversion method for converting a bitstream of a first format, containing content data, into a bitstream of a second format, comprising:
    splitting the bitstream of the first format in time sequential fashion into a plurality of split bitstreams of the first format so as to provide an overlapping portion at each splitting position;
    converting the plurality of split bitstreams of the first format in a parallel fashion into a plurality of split bitstreams of the second format; and
    connecting the plurality of split bitstreams of the second format to one another,
    wherein the bitstream of the first format contains a moving image stream and an audio stream, and
    wherein the overlapping portion at each splitting position of the audio stream is made to have a longer time length than the overlapping portion at each splitting position of the moving image stream has.

2. The bitstream conversion method as claimed in claim 1, wherein the bitstream of the first format contains a moving image stream, the method further comprising:
    for each key frame contained in the overlapping portion of the split bitstreams of the second format, generating prescribed auxiliary information that is referred to in order to select a connecting position at which to connect together the split bitstreams of the second format;
    when connecting the plurality of split bitstreams of the second format to one another, determining each connecting frame position by selecting a key frame position where the difference between the auxiliary information generated for one stream and the auxiliary information generated for an ensuing stream is the smallest; and
    connecting the one stream to the ensuing stream at the connecting frame position.

3. The bitstream conversion method as claimed in claim 2, wherein the auxiliary information includes at least information indicating picture quality of the key frame and the amount of information that occurs.

4. The bitstream conversion method as claimed in claim 2, wherein when the connecting frame position that satisfies a predetermined condition is not found, the conversion is redone for the bitstream in the overlapping portion.

5. A bitstream conversion apparatus for converting a bitstream of a first format, containing content data, into a bitstream of a second format, comprising:
    a splitting unit which splits the bitstream of the first format in time sequential fashion into a plurality of split bitstreams of the first format;
    a plurality of conversion units which convert the plurality of split bitstreams of the first format into a plurality of split bitstreams of the second format; and
    a connecting unit which connects the plurality of split bitstreams of the second format to one another,
    wherein the splitting unit splits the bitstream of the first format so as to provide an overlapping portion at each splitting position;
    wherein the bitstream of the first format contains a moving image stream and an audio stream, and
    wherein the splitting unit sets the overlapping portion at each splitting position of the audio stream so as to have a longer time length than the overlapping portion at each splitting position of the moving image stream has.

6. The bitstream conversion apparatus as claimed in claim 5,
wherein the bitstream of the first format contains a moving image stream,
wherein each of the conversion units includes an auxiliary information generating unit which, for each key frame contained in the overlapping portion of the split bitstreams of the second format, generates prescribed auxiliary information that is referred to in order to select a connecting position at which to connect together the split bitstreams of the second format, and
wherein the connecting unit includes:
a connecting frame position determining unit which determines a connecting frame position for connecting one stream to an ensuing stream by selecting a key frame position where the difference between the auxiliary information generated for the one stream and the auxiliary information generated for the ensuing stream is the smallest; and
a data connecting unit which connects the one stream to the ensuing stream at the connecting frame position.

7. The bitstream conversion apparatus as claimed in claim 6, wherein the auxiliary information includes at least information indicating picture quality of each frame and the amount of information that occurs.

8. The bitstream conversion apparatus as claimed in claim 6, wherein when the connecting frame position that satisfies a predetermined condition is not found, the conversion unit redoes the conversion for the bitstream in the overlapping portion.

9. A non-transitory computer-readable storage medium storing a bitstream splitting program which, when executed by a computer for bitstream splitting process, causes the computer for bitstream splitting process to execute a process comprising:
splitting a bitstream of a first format, containing content data, in time sequential fashion into a plurality of split bitstreams of the first format which are to be converted into a plurality of split bitstreams of the second format in a parallel fashion by a plurality of conversion units, so as to provide an overlapping portion at each splitting position,
wherein the bitstream of the first format contains a moving image stream and an audio stream, and the overlapping portion at each splitting position of the audio stream is made to have a longer time length than the overlapping portion at each splitting position of the moving image stream has.

10. A non-transitory computer-readable storage medium storing a bitstream conversion program for converting the split bitstream of the first format containing at least a moving image stream, provided by the bitstream splitting program stored in the non-transitory computer-readable storage medium of claim 9, when the bitstream conversion program is executed by a computer for bitstream conversion process, the bitstream conversion program causing the computer for bitstream conversion process to execute a process comprising:
converting the split bitstream of the first format into the split bitstream of the second format, and
generating, for each key frame contained in the overlapping portion of the split bitstream of the second format, prescribed auxiliary information that is referred to in order to select a connecting position at which to connect together the split bitstreams of the second format.

11. The non-transitory computer-readable storage medium as claimed in claim 10, wherein the auxiliary information includes at least information indicating picture quality of the key frame and the amount of information that occurs.

12. A non-transitory computer-readable storage medium storing a bitstream connecting program for connecting the plurality of split bitstreams of the second format to one another, provided by the bitstream conversion program stored in the non-transitory computer-readable storage medium of claim 10, when the bitstream connecting program is executed by a computer for bitstream connecting process, the bitstream connecting program causing the computer for bitstream connecting process to execute a process comprising:
determining a connecting position for connecting one stream to an ensuing stream by selecting a key frame position where the difference between the auxiliary information generated for the one stream and the auxiliary information generated for the ensuing stream is the smallest; and
connecting the one stream to the ensuing stream at the thus determined connecting position.

13. The non-transitory computer-readable storage medium storing the bitstream conversion program providing split bitstream of the second format to the bitstream connecting program stored in the non-transitory computer-readable storage medium of claim 12, the bitstream conversion program causing the computer for bitstream conversion process to execute the process further comprising:
reconverting the bitstream in the overlapping portion when the computer for bitstream connecting process on which the bitstream connecting program is run is unable to find the connecting frame position that satisfies a predetermined condition.

14. The bitstream conversion method as claimed in claim 3, wherein when the connecting frame position that satisfies a predetermined condition is not found, the conversion is redone for the bitstream in the overlapping portion.

15. The bitstream conversion apparatus as claimed in claim 7, wherein when the connecting frame position that satisfies a predetermined condition is not found, the conversion unit redoes the conversion for the bitstream in the overlapping portion.

* * * * *